United States Patent [19]

Henriques

[11] 4,406,402

[45] Sep. 27, 1983

[54] FLUE HEAT RECOVERY SYSTEM

[76] Inventor: Joseph Henriques, 32 Hidden Brook Dr., Brookfield, Conn. 06804

[21] Appl. No.: 258,437

[22] Filed: Apr. 28, 1981

[51] Int. Cl.³ .............................................. F24D 3/08
[52] U.S. Cl. ..................................... 237/19; 237/8 R; 126/132; 165/DIG. 12
[58] Field of Search ..................... 237/19, 54, 55, 8 R; 165/DIG. 2, DIG. 12, 154; 126/101, 132; 236/10; 122/20 B, 31 R

[56] References Cited

U.S. PATENT DOCUMENTS

| | | | |
|---|---|---|---|
| 2,295,115 | 9/1942 | Keller | 122/20 |
| 3,507,256 | 4/1970 | Sander | 122/20 |
| 3,896,992 | 7/1975 | Borovina et al. | 237/19 |
| 3,913,663 | 10/1975 | Gates | 165/102 |
| 3,916,991 | 11/1975 | Trump | 165/163 |
| 3,991,821 | 11/1976 | Cook et al. | 165/103 |
| 3,999,709 | 12/1976 | Estabrook | 237/8 |
| 4,034,803 | 7/1977 | Reed et al. | 165/103 |
| 4,037,567 | 7/1977 | Torres | 122/20 |
| 4,048,962 | 9/1977 | Pristelski | 122/20 |
| 4,053,106 | 10/1977 | Karl | 237/8 |
| 4,096,616 | 6/1978 | Coffinberry | 165/154 |
| 4,122,801 | 10/1978 | Burns | 122/20 |
| 4,132,263 | 1/1979 | Stinnett | 165/48 |
| 4,136,731 | 1/1979 | DeBoer | 165/12 |
| 4,143,638 | 3/1979 | Kamstra | 122/20 B |
| 4,143,816 | 3/1979 | Skadeland | 237/8 |
| 4,158,439 | 6/1979 | Gibbs | 237/55 |
| 4,163,430 | 8/1979 | Neumann | 122/20 |
| 4,178,907 | 12/1979 | Sweat, Jr. | 126/101 |
| 4,232,654 | 11/1980 | Gary | 126/400 |
| 4,240,361 | 12/1980 | Wisniewski | 110/119 |
| 4,277,021 | 7/1981 | Daye | 237/12.1 |

Primary Examiner—William R. Cline
Assistant Examiner—John F. McNally
Attorney, Agent, or Firm—Alfred A. Fressola; Melvin I. Stoltz; Robert H. Ware

[57] ABSTRACT

A flue gas heat recovery system comprises an exhaust gas to air heat exchanger, a hot air to water heat exchanger, a fan, a circulating pump, and a control system which senses the temperature of the exiting air from the air heat exchanger and the temperature of the water leaving the water heat exchanger in combination with the thermostatic sensed temperature of the hot water heating system in order to operate the system in a desired manner. The system may also be used for space heating purposes. The control system in conjunction with the air heat exchanger provides a fail safe system which can be used with solid fueled stoves and fireplace inserts as well as furnaces and hot water boilers without danger of water overheating even during electrical power outages.

20 Claims, 22 Drawing Figures

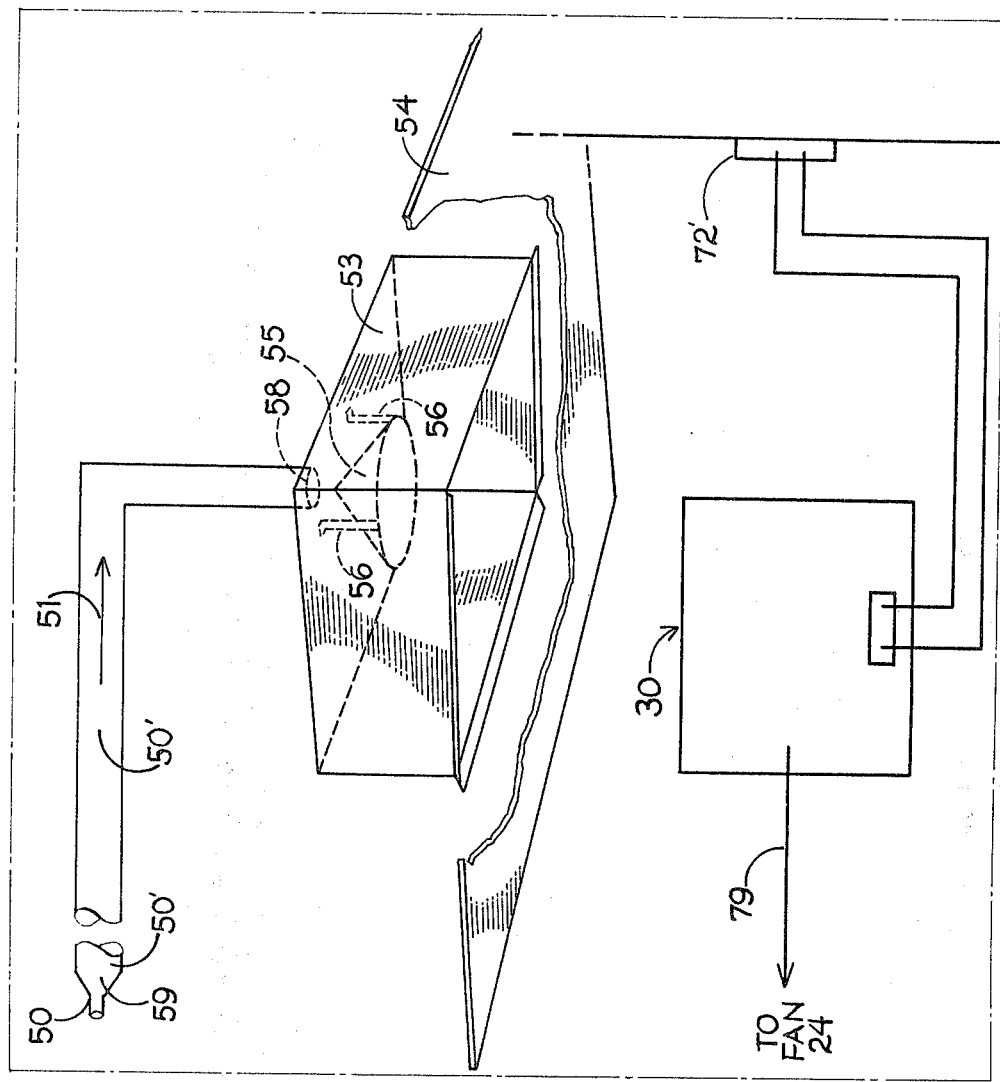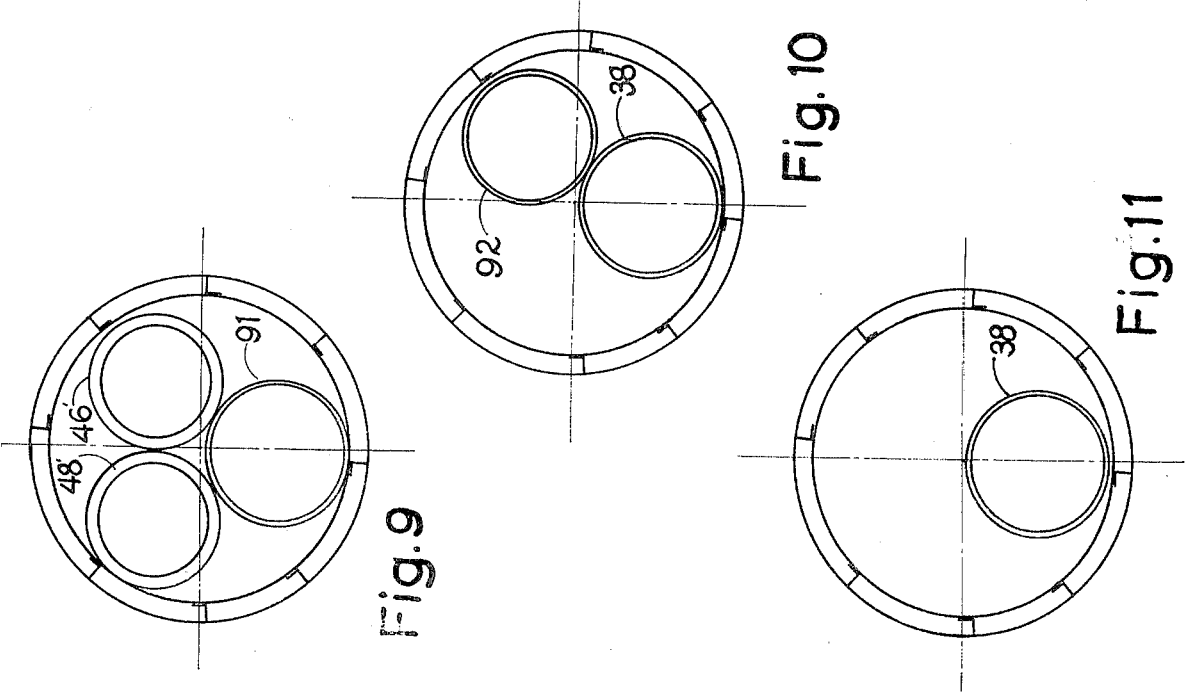

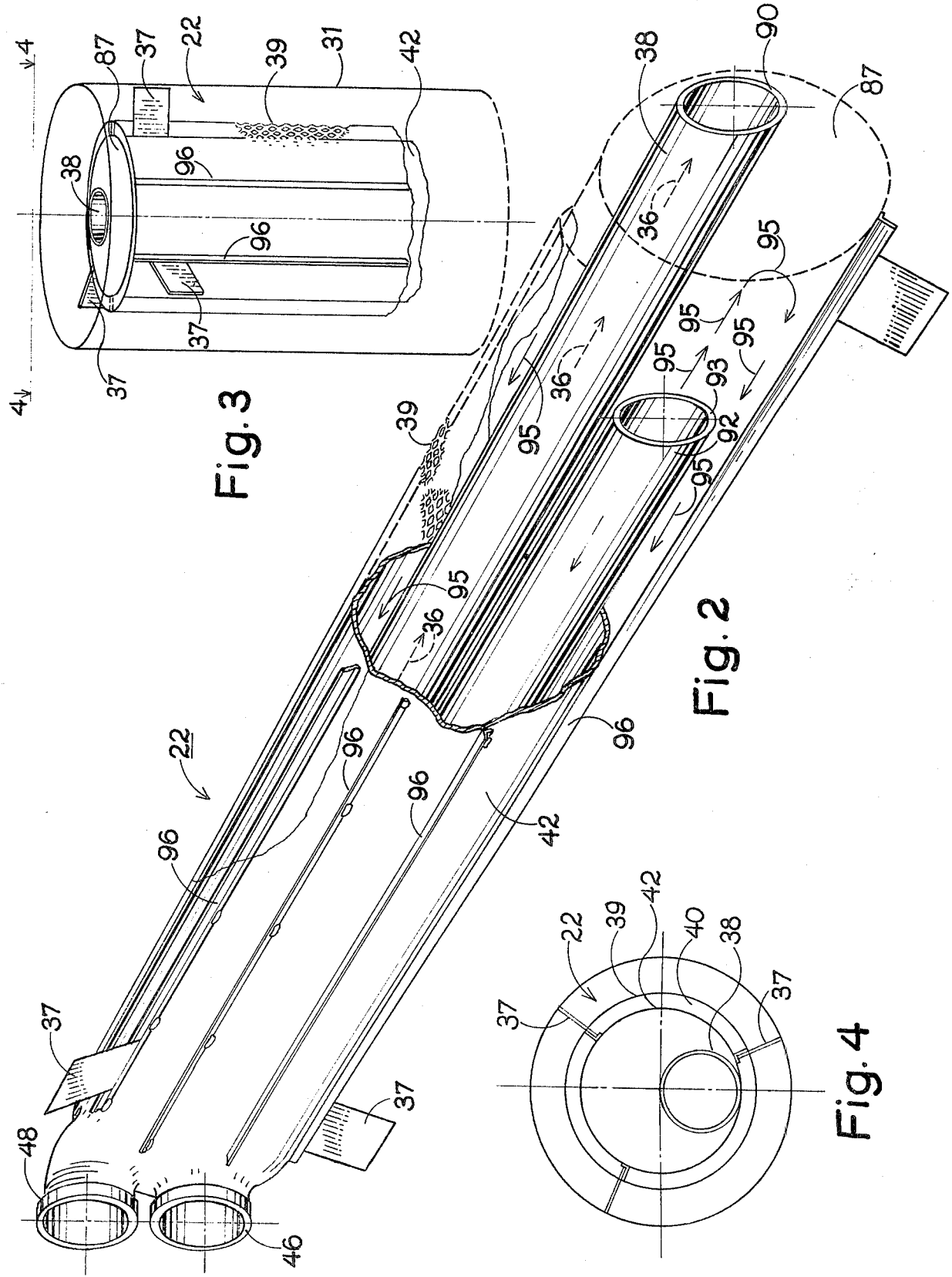

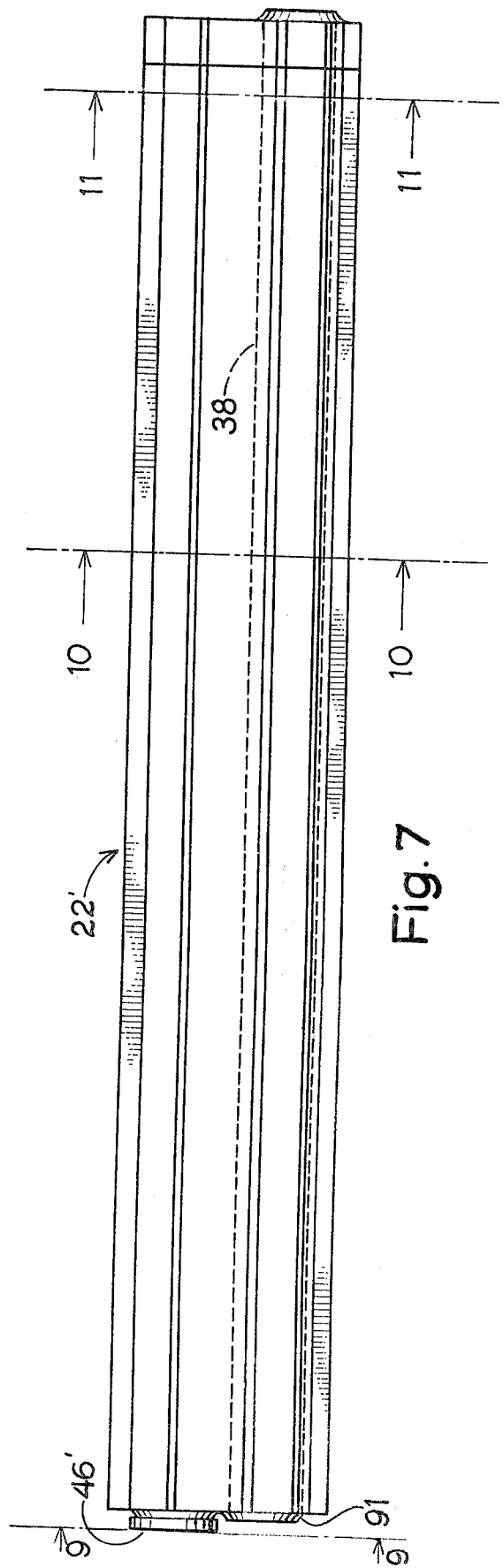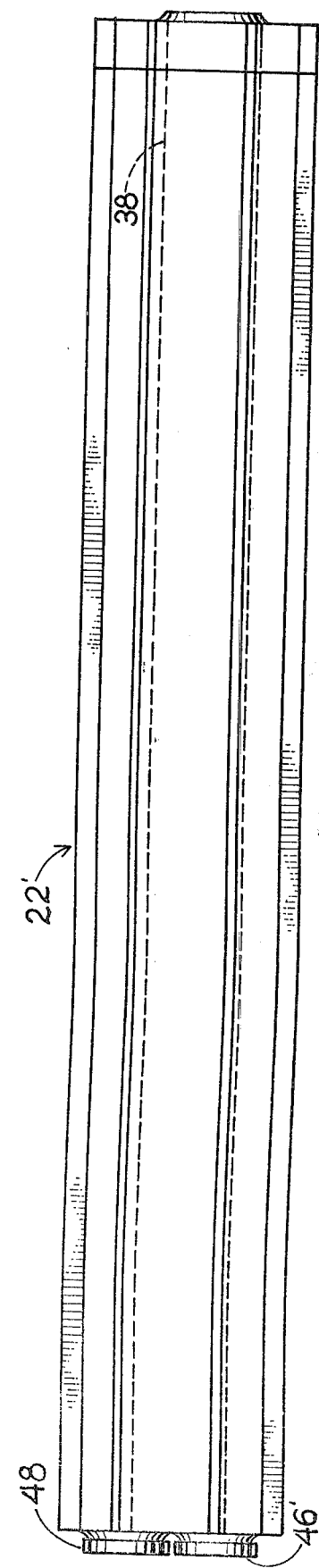

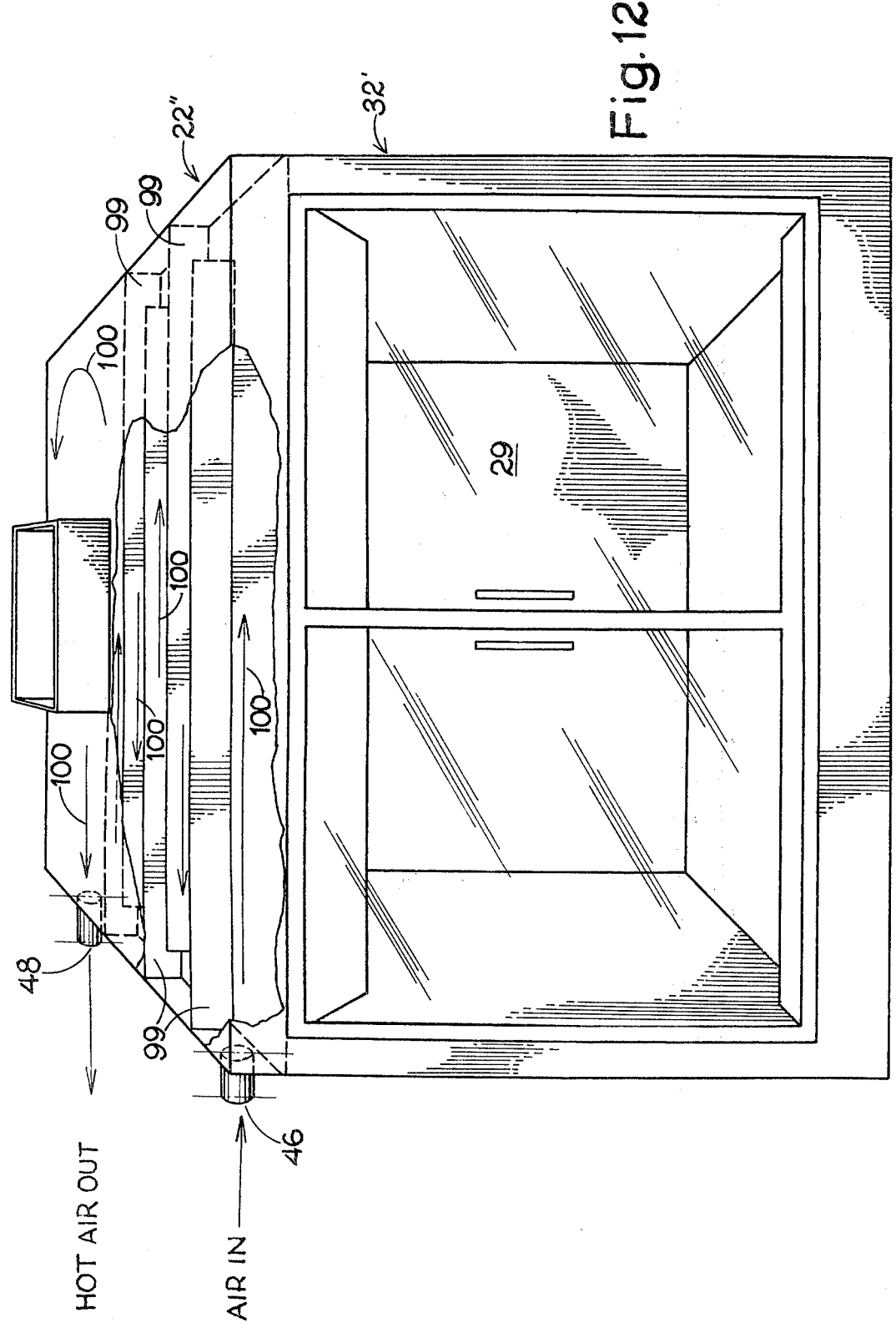

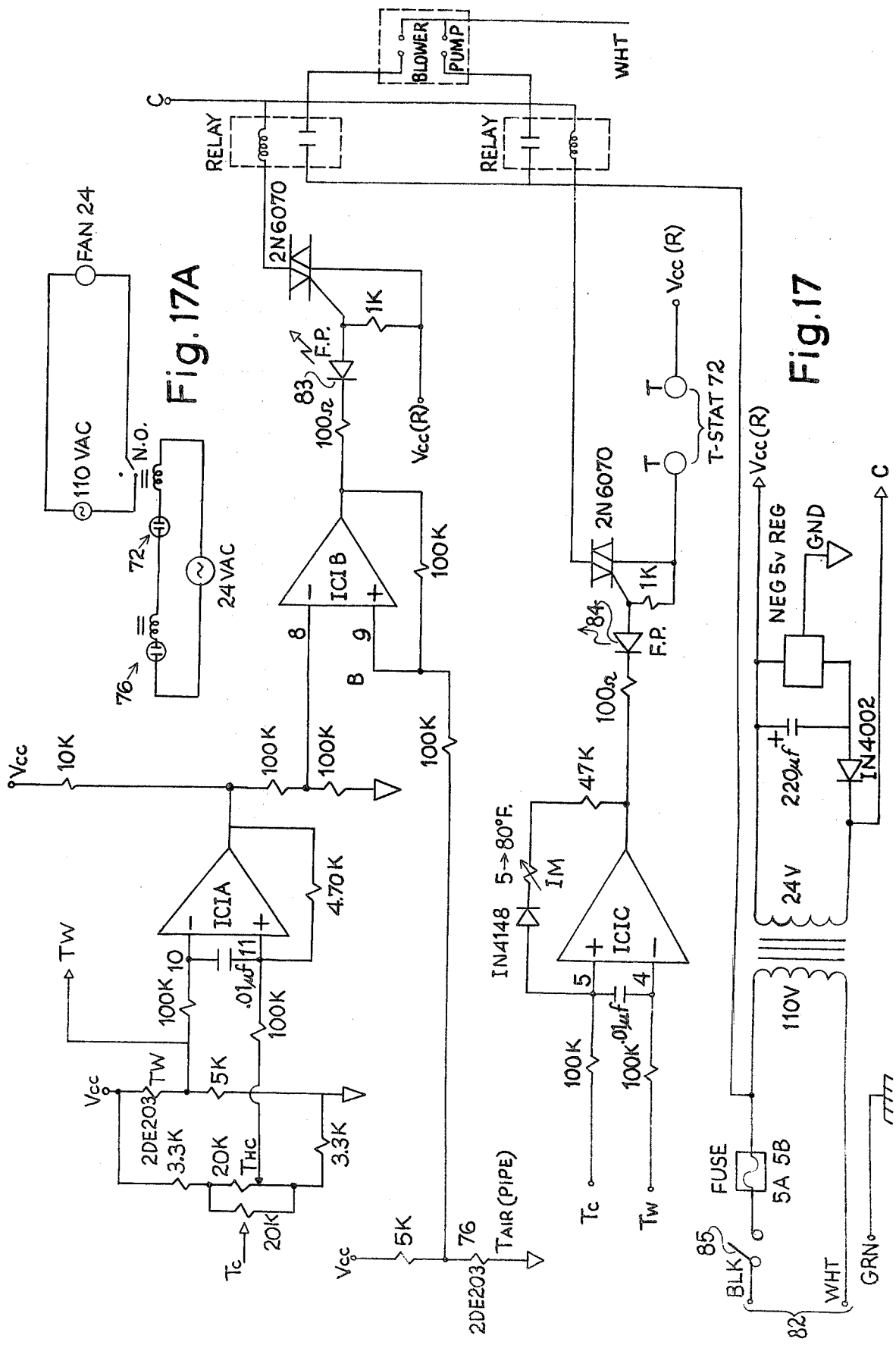

FLUE HEAT RECOVERY SYSTEM

TECHNICAL FIELD

The present invention relates to supplemental heating systems which use the otherwise wasted heat of exhaust gases as a source of heat for both hot air and hot water applications and in particular to an overall system which provides a fail-safe and self-regulating operation.

BACKGROUND ART

As is well known in the heating art, the exhaust gases resulting from burning a fuel, whether it be oil, gas, coal, wood, or the like, are generally at a relatively high temperature as they exit through the flue to the outside. This has primarily been due to the fact that in previous years a relatively high exhaust gas temperature, though wasting potentially valuable heat, was of little consequence since fuel was inexpensive. In recent years with the ever escalating price for fossil fuels and the concomitant increase in price for wood as an alternative fuel, this wasteful escape of high temperature exhaust gases has been considered as a source of potentially valuable heat.

The following patents describe various devices to extract some of this wasted heat:

| Patent No. | Inventor | Date Issued |
| --- | --- | --- |
| 3,507,256 | Sander | April 21, 1970 |
| 3,896,992 | Borovina et al | July 29, 1975 |
| 3,913,663 | Gates | October 21, 1975 |
| 3,916,991 | Trump | November 4, 1975 |
| 3,991,821 | Cook et al | November 16, 1976 |
| 3,999,709 | Estabrook | December 28, 1976 |
| 4,034,803 | Reed et al | July 12, 1977 |
| 4,037,567 | Torres | July 26, 1977 |
| 4,048,962 | Pristelski | September 20, 1977 |
| 4,053,106 | Karl | October 11, 1977 |
| 4,122,801 | Burns | October 31, 1978 |
| 4,132,263 | Stinnett | January 2, 1979 |
| 4,136,731 | DeBoer | January 30, 1979 |
| 4,143,816 | Skadeland | March 13, 1979 |
| 4,158,439 | Gibbs | June 19, 1979 |
| 4,163,430 | Neumann | August 7, 1979 |
| 4,178,907 | Sweat, Jr. | December 18, 1979 |

A number of these references are directed to using the exhaust gases in the flue to preheat water for domestic hot water purposes as well as for home heating purposes. Thus U.S. Pat. Nos. 3,507,256, Sander, 3,896,992, Borovina et al, 3,916,991, Trump, 3,991,821, Cook et al, 3,999,709, Estabrook, 4,037,567, Torres, 4,048,962, Pristelski, 4,053,106, Karl, 4,122,801, Burns, 4,136,731 DeBoer, 4,143,816, Skadeland, 4,158,439, Gibbs, and 4,163,430, Neumann are all directed to some type of device for heating water with exhaust flue gases. None of these devices are directed to heating air with the exhaust flue gases in an exhaust gas to air heat exchanger as does the present invention.

It should be noted that many of these references recognize the problems of heating water with exhaust flue gases in a gas-to-water heat exchanger; namely, condensation due to the relatively cool temperature of the water passiang through the heat exchanger and potential excess heating of the water. This latter problem is especially relevant when the source of exhaust gases is from a solid fuel fire which will continue to burn during a power failure; such as a wood burning stove, a fireplace insert and the like. In such situations, the water circulating pump associated with such water heat exchangers stops and consequently the water within the heat exchanger can turn to steam with potentially explosive consequences.

Various approaches have been taken in these references to overcome some of these difficulties including the use of safety flaps (see U.S. Pat. No. 3,507,256 Sander) as well as using a second heat exchanger to dump excess heat (see U.S. Pat. No. 3,999,709 Estabrook).

The problem with heating water has also been discussed in U.S. Pat. No. 2,295,115, Keller, disclosing a retractable water heater. This device however is not used for heating water with exhaust flue gases. It does point out that overheating water with a heat exchanger is a potential problem. This basic invention however is directed to a device for retractably moving the heat exchanger from the source of heat so as to prevent overheating.

U.S. Pat. Nos. 3,913,663, Gates and 4,034,803, Reed et al are directed to an exhaust gas to air heat exchanger in order to recover some of the heat normally lost to the chimney from the escaping exhaust gases. These exhaust gas to air heat exchangers, though based upon the same heating principles as the present invention, nevertheless do not disclose the method of fabricating the exhaust air heat exchanger as shown and claimed in the present application. Specifically the present invention discloses an exhaust air heat exchanger which is basically cylindrical in nature having an inlet and outlet port and an internal conduit passing through the heat exchanger. It further has an outer screen forming its outer surface which is spaced away from an inner cylindrical shell by a plurality of radially projecting longitudinal ribs. This combination results in a heat exchanger having high heat transfer between the exhaust gas and the air flowing through the heat exchanger. The heat exchanger is also able to be centrally positioned within the flue of a chimney so as to not significantly impede the flow of the exhaust gases and to also promote high temperature interaction between the exhaust gases and the heat exchanger. This in turn helps prevent creosote buildup on the inside of the flue and on the heat exchanger when the heat exchanger is used with wood, coal, or other solid fueled heating devices.

It has been found that the space generated between the outer screen surface and the cylindrical shell generates high temperatures along the screen and the accompanying cylindrical shell which in essence keeps the outer surfaces of the heat exchanger at elevated temperatures, greatly minimizing the possibility of creosote buildup. Indeed, if the fire is maintained at a normal oxygen level so as to promote complete combustion of the solid fuel, the exhaust gas temperatures are sufficient to eliminate creosote buildup.

Thus not only does the present invention promote efficient heat exchange between the exhaust gases and the air passing through the heat exchanger but also promotes a clean heat exchanger and flue giving rise to a more efficient overall system. The references cited do not show such a heat exchanger design thus are distinguishable from the present invention.

U.S. Pat. No. 3,913,663, Gates discloses a preheater in which the exhaust gases move around the air to be heated. The inner relationship of this heat exchanger with the flue pipe is substantially different from the present invention since Gates shows a chamber which is interposed between the exhaust flue pipes normally associated with the heating device. Thus the energy conversion chamber disclosed in Gates is not mounted within a flue pipe as is the present invention, but is actually placed between two sections of flue pipe. Furthermore Gates does not disclose or suggest the radially-spaced screen forming the outer surface of a heat exchanger in conjunction with a cylindrical shell and further in conjunction with an air inlet pipe which promotes a circuitous path for the air flow within the heat exchanger to thereby obtain better heat transfer to the air as it passes through the exchanger. For all of these reasons the Gates energy conversion chamber is distinguished from the exhaust gas to air heat exchanger used in the present invention.

Gates also does not disclose or suggest the other aspects of the present invention including the overall system for heating hot water by using a second heat exchanger with controls managing the overall operation of the system. It also does not disclose using the exhaust gas to air heat exchanger for purposes of room air heating in conjunction with thermostatic control.

U.S. Pat. No. 4,034,803, Reed et al discloses a gas-to-gas heat exchanger utilizing exhaust gases and is particularly directed to techniques for using such heat exchangers while preventing condensation of sulfuric acid while burning fuels containing sulfur. The overall arrangement of this heat exchanger is completely unlike the present invention and does not utilize an outer screen in conjunction with a cylindrical shell for generating an air space therebetween which is used in conjunction with an air inlet pipe for promoting a high heat transfer between the exhaust gases and the circulating air.

Finally, U.S. Pat. Nos. 4,132,263, Stinnett and 4,178,907, Sweat, Jr., although partially disclosing the use of exhaust gases to heat air, do not disclose or suggest the present invention. Stinnett discloses a combined household heating and cooling unit for air and water primarily utilizing a water reservoir and an air circulating system as shown in FIG. 2. The air circulating system receives heat from the walls of the firebox and alternatively from the water reservoir. This technique for heating air is unlike the present invention.

Sweat, Jr. discloses a unified hot water forced air heating system which utilizes two auxiliary heat exchangers mounted within a forced air heater 12. One of these is a gas-to-gas heat exchanger 62 which incorporates a series of vanes 76 mounted to the exterior of the flue pipe. This arrangement of a heat exchanger is completely unlike the heat exchanger disclosed in the present invention.

It should be noted that in all of these references a failsafe control system utilizing an exhaust gas to air heat exchanger with a hot air to water heat exchanger is neither disclosed nor suggested. In particular the present invention is able to provide supplemental hot water for either domestic hot water or hot water heating systems which uses the exhaust gases as a source of this supplemental heat yet is able to operate in a failsafe manner with solid fuel heating devices. The present invention thus provides an overall system for heating water which does not have the condensation and overheating problems associated with the prior art. It furthermore is a self-regulating system which automatically obtains supplemental heat if available from the heating device without the need for human intervention.

Furthermore, even when used for only hot air space heating purposes, that is, when not utilizing a hot air to water heat exchanger, the system uses an exhaust gas to air heat exchanger which is mounted within the flue of a heating device that is thermostatically self-regulating. This heat exchanger also utilizes a unique design not shown in the prior art. Consequently an overall failsafe system is disclosed which is believed to be new in the art of recovering supplemental heat from exhaust gases.

DISCLOSURE OF THE INVENTION

A flue heat recovery system is disclosed which is able to efficiently extract waste heat from exhaust gases as they exit through a flue connected to a heating device. The extracted heat can be used to supply supplemental heat to room air, hot water, or hot water heating systems. The heat recovery system is self-regulated and operates in a failsafe manner, even during electrical power outages.

In one embodiment of the invention, two different heat exchangers are utilized: an exhaust gas to air heat exchanger which is mounted in the flue connecting the heating device to the chimney, and a hot air to water heat exchanger that uses the hot air from the exhaust gas to air heat exchanger as a source of heat. The water heat exchanger can be used to supply hot water for a domestic hot water heater or for space heating purposes.

Because the heat exchanger associated with exhaust gas heats air, the problems associated with an exhaust gas to water heat exchanger are completely eliminated; namely, condensation of creosote and other materials onto the outer surfaces of the heat exchanger, as well as potential hazards associated with overheating the water in the heat exchanger especially during power failures when circulating pumps are inoperative. The present invention, through its exhaust gas to air heat exchanger supplies heated air to the hot air to water heat exchanger, and if a power outage occurs, no harm can be done to the exhaust gas to air heat exchanger since the heated air will merely convect out of the heat exchanger to the rest of the system. Hazards associated with the generation of steam are completely eliminated.

The present invention is also completely self-regulated through use of a control system which senses the air temperature exiting from the exhaust gas to air heat exchanger as well as the water temperatures exiting from the hot air to water heat exchanger. It uses this data in conjunction with a thermostat associated either with a hot water heater or a room so as to activate a fan and the water circulator only during the times that heat is necessary and when such heat is available from the heating device supply heat to the flue.

Furthermore, the design of the exhaust gas to air heat exchanger is new. The device basically comprises an elongated cylindrical solid outer shell and two end caps through which a conduit extends for the passage of exhaust flue gases. An air inlet tube also extends into the chamber defined by the cylindrical shell and end caps so as to cause the incoming air to travel throughout nearly the entire length of the heat exchanger before exiting through a hot air outlet port. The incoming air also circulates around the exhaust conduit gas so as to obtain heat from the exhaust gases passing therethrough. Furthermore, attached to the outer cylindrical shell of the heat exchanger are a plurality of radially extending ribs which, at their outer periphery, form a region for connecting a cylindrically shaped screen. Thus, an air space exists between the screen and the cylindrical shell through which the exhaust gases can readily pass in an interleaving fashion. It has been experimentally found that due to the effect of the air space and the screen as well as the high heat conductivity of the radially extending ribs, that the exhaust gases maintain the screen, ribs and cylindrical shell of the heat exchanger at a relatively high temperature, causing high heat conductivity while minimizing creosote buildup.

Furthermore, the exhaust gas to air heat exchanger is radially mounted inside the flue pipe associated with the heating device. The flue pipe normally associated with the heating device is usually replaced with a slightly larger diameter flue pipe so that its cross-sectional interior area, subtracting the cross-sectional area of the heat exchanger, approximates that of the original flue pipe. It has been found that due to the central location of the exhaust gas to air heat exchanger within the flue pipe, exhaust gases tend to contact the inner periphery of the flue pipe to a greater extent than without the heat exchanger present. This results in the flue pipe being maintained at a higher temperature, giving additional heat to the surrounding room, as well as minimizing creosote and other deposit buildup on the interior surface of the flue pipe.

Furthermore, the flue pipe into which the exhaust gas to air heat exchanger is installed may have a portion extending upwardly above the heat exchanger and above the exit of the flue pipe to the chimney. This flue pipe extension forms a dead exhaust gas space above and surrounding the upper portion of the heat exchanger so as to promote better heat transfer to the heat exchanger from the exhaust gases before they exit up the chimney.

Furthermore, the hot air to water heat exchanger is fabircated in a straightforward manner which provides for efficient heat transfer between the hot air and the water circulating therethrough. This exiting air from this heat exchanger can additionally be used for hot air heating purposes.

In a second embodiment of the present invention in which the hot air to water heat exchanger is not used, the hot air exiting from the exhaust gas to air heat exchanger is connected to a hot air vent having a centrally located baffle for distributing and mixing hot air to the surrounding room in an efficient and quiet manner. This embodiment also uses thermostatic control for its operation. This embodiment may also use a venturi type tee connected along the length of the duct connecting the heat exchanger to the hot air vent. A second duct is connected to the tee and extends to near the ceiling of the associated room. This duct, in combination with the tee and hot air flow passing therethrough, is able to withdraw by suction hot air otherwise pocketed along the room ceiling.

OBJECTS OF THE INVENTION

It is therefore a principal object of the present invention to provide an exhaust gas flue heat recovery system which has failsafe operation even during electrical power failures regardless of the type of fuel burned in the heating device associated with the flue.

Another object of the present invention is a flue heat recovery system of the above description further having controls for monitoring the temperature of either hot water or air to be heated by the system so as to only supply heat when required and when available from the exhaust gases.

A still further object of the present invention is a flue heat recovery system of the above description comprising an exhaust gas to air heat exchanger and a hot air to water heat exchanger, the latter using the heated air from the former heat exchanger as its source of heat.

Another object of the present invention is to provide a flue heat recovery system of the above description in which the exhaust gas to air heat exchanger comprises a cylindrical shell with two end caps through which a conduit passes for allowing the exhaust gases to pass through the heat exchanger without intermixing with the air being heated by the heat exchanger and further wherein the heat exchanger has a cylindrically shaped peripheral screen radially mounted about the cylindrical shell forming an air space therebetween for the passage of exhaust gases so as to maintain the heat exchanger at a temperature substantially equal to that of the exhaust gases.

A still further object of the present invention is to provide a flue heat recovery system of the above description in which the exhaust gas to air heat exchanger can be centrally mounted within the flue pipe associated with the heating device so as to cause a substantial portion of the exhaust gases to pass near the inner periphery of the flue pipe and thereby minimize creosote and other deposits on both the heat exchanger and the flue pipe, especially when solid fuel is used by the associated heating device.

Another object of the present invention is to provide a flue heat recovery system of the above description in which the hot air to water heat exchanger is simply constructed while providing efficient heat transfer between the hot air and water.

A still further object of the present invention is to provide an exhaust gas to air heat exchanger in which the hot air from the heat exchanger is used for space heating purposes by having the air pass through ductwork terminating with a vent having an internal baffle to diffuse and mix the hot air as it enters the room to be heated.

A still further object of the present invention is to utilize a chamber formed in the uppermost portion of a fireplace insert or freestanding stove for the purposes of acting as a heat exchanger between the exhaust gases from the fuel and the air to be heated instead of utilizing the exhaust gas to air heat exchanger mounted within the flue connected to the heating device.

Another object of the present invention is a flue heat recovery system further having a venturi type tee connected between the pipe and ductwork carrying the hot air from the exhaust gas to the air heat exchanger, wherein a duct is connected to the tee so as to remove and mix with the hot air from the heat exchanger the warm air trapped along the ceiling of an associated room.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings, in which:

FIG. 1A is a diagrammatic view of an alternative righthand (dotted) portion of FIG. 1, showing a domestic hot air delivery system rather than a hot water system;

FIG. 2 is a partially broken away perspective view of one embodiment of the exhaust gas to air heat exchanger in which the air inlet and hot air outlet ports are at substantially 90° with respect to the bottom end cap of the heat exchanger, and also showing the internal construction of the heat exchanger, including the air inlet tube and the exhaust gas conduit which passes through both end caps of the heat exchanger, and also showing the radially extending ribs attached to the cylindrical shell of the heat exchanger over which a cylindrical screen is attached for increasing the heat exchange between the exhaust gases and the air passing in the heat exchanger, and also showing in phantom the radially extending fins used to support the heat exchanger from the inside walls of the flue pipe;

FIG. 3 is a partially broken away perspective view of the exhaust gas to air heat exchanger shown in FIG. 2 illustrating how it is positioned within the flue pipe, and also showing details of the heat exchanger construction;

FIG. 4 is a cross-sectional view taken along line 4—4 of FIG. 3 illustrating the exhaust gas to air heat exchanger shown in FIGS. 2 and 3 mounted within the flue pipe and in particular how the vanes of the heat exchanger are connected to its cylindrical shell for spacing the heat exchanger centrally within the flue pipe;

FIG. 7 is a side elevational view of an alternative embodiment of the heat exchanger shown in FIG. 2 with the air inlet and outlet ports in a plane parallel to the bottom end cap and the opening of the exhaust conduit, and also showing in phantom the exhaust gas conduit passing through the heat exchanger;

FIG. 8 is a side view of the heat exchanger shown in FIG. 7 basically rotated 90° with respect to the heat exchanger's cylindrical axis and again showing in phantom the exhaust gas conduit passing through the heat exchanger;

FIG. 9 is an end view of the heat exchanger taken along line 9—9 of FIG. 7 showing the air inlet and outlet ports as well as the opening of the exhaust conduit passing through the heat exchanger;

FIG. 10 is a cross-sectional view taken along line 10—10 of FIG. 7 or 10'—10' of FIG. 5 showing the placement of the air inlet tube and the exhaust gas conduit as they both extend in the heat exchanger;

FIG. 11 is a cross-sectional view taken along line 11—11 of FIG. 7 or 11'—11' of FIG. 5 illustrating the termination of the air inlet tube within the heat exchanger (that it is no longer seen in this cross-sectional view) but showing that the exhaust gas conduit passes through the heat exchanger;

FIG. 12 is a perspective, partially broken away view of a heating device in which its upper portion comprises an exhaust gas to air heat exchanger for heat transfer to the air from the exhaust gases in the heating device and thereby can be used in place of the heating device shown in FIG. 1, eliminating the need for the exhaust gas to air heat exchanger also shown in FIG. 1;

FIG. 17 is a schematic view of the controller shown in FIG. 1;

FIG. 17A is a schematic view of the controller used for the flue heat recovery system shown in FIG. 1A.

BEST MODE FOR CARRYING OUT THE INVENTION

Figure 1:
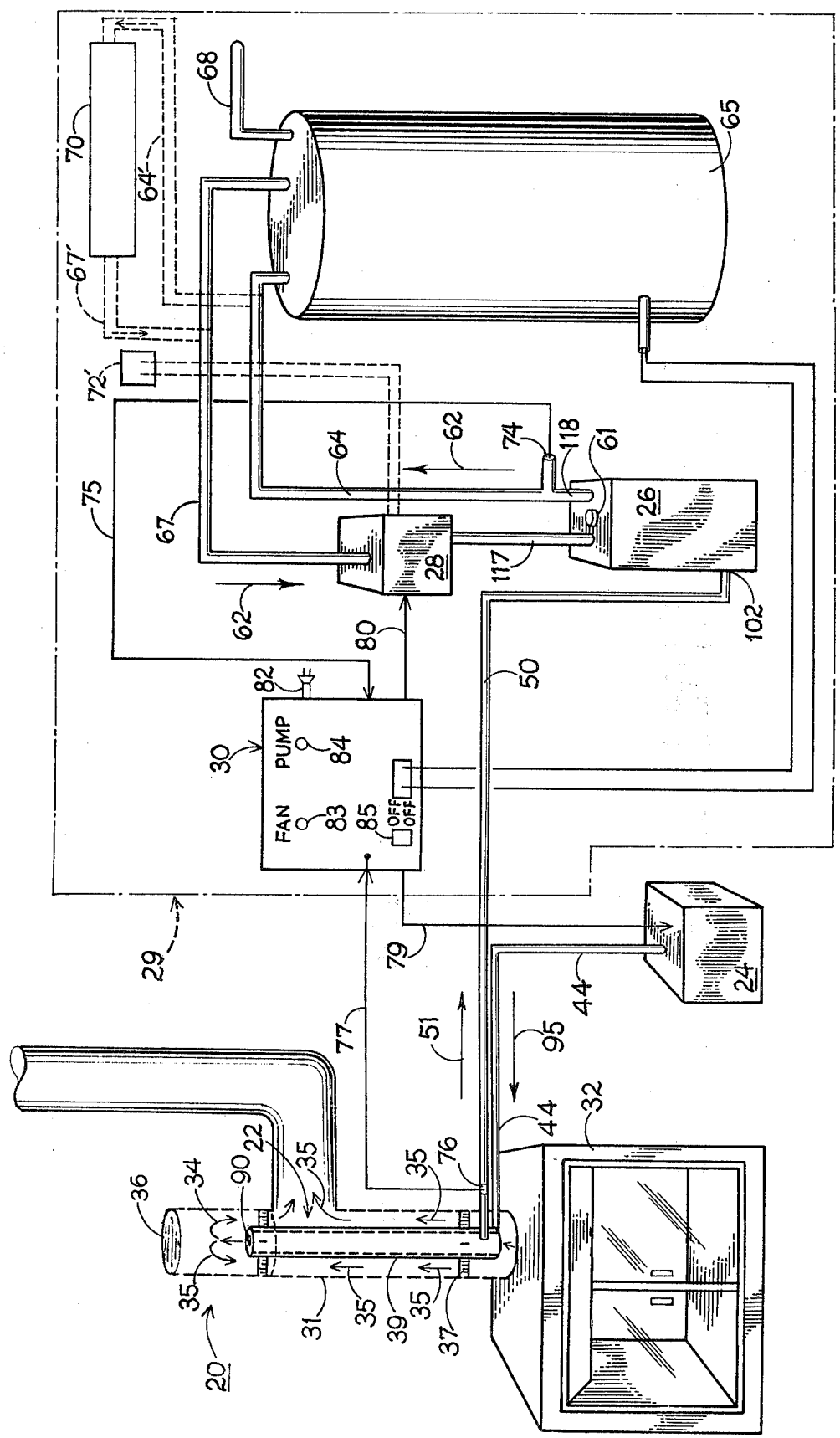
FIG. 1 is a diagrammatic view of a flue heat recovery system according to the present invention illustrating a heating device with its associated flue in which an exhaust gas to air heat exchanger is mounted, with a fan interconnected to the air inlet port of this heat exchanger and the outlet port of the heat exchanger connected to a hot air to water heat exchanger, and in which the hot water heat exchanger is associated with a circulating pump for delivering hot water to a domestic hot water heater or, as shown in phantom, to a baseboard hot water heating system; and further showing the control module for determining when to activate the fan and the water circulator depending upon sensed temperatures of the overall system.

As best seen in FIG. 1, a flue heat recovery system 20 according to the present invention comprises in one embodiment an exhaust gas to air heat exchanger 22, a fan 24 for forcing air through heat exchanger 22, a hot air to water heat exchanger 26, a water circulator 28, and a controller 30 for sensing the temperatures of the exiting hot air and the exiting hot water and using this data in combination with the desired temperature for domestic hot water so as to appropriately control the overall system. The exhaust gas to air heat exchanger 22 is centrally mounted within flue 31 so that the exhaust gases emanating from heating device 32 pass through and around the heat exchanger before exiting up chimney 33. As shown in FIG. 1, the flue may include a flue extension 34 having a sealed end cap 36 for trapping the exhaust gases within its volume and thereby promoting better heat transfer to the heat exchanger 22 before the exhaust gases exit up chimney 33.

The flow of the exhaust gases in flue 31 and flue extension 34 are shown generally by flow arrows 35. It should be noted that the heat exchanger 22 has a conduit 38 through which the exhaust gases can also pass. It is therefore apparent that the exhaust gases before exiting up chimney 33 are in intimate contact with the heat exchanger, especially due to an outer screen 39 forming an air space 40 between itself and the cylindrical shell 42 of the heat exchanger (see FIGS. 2-4). Details of the principle of operation of the heat exchanger 22 are explained more fully below.

Figure 1C:
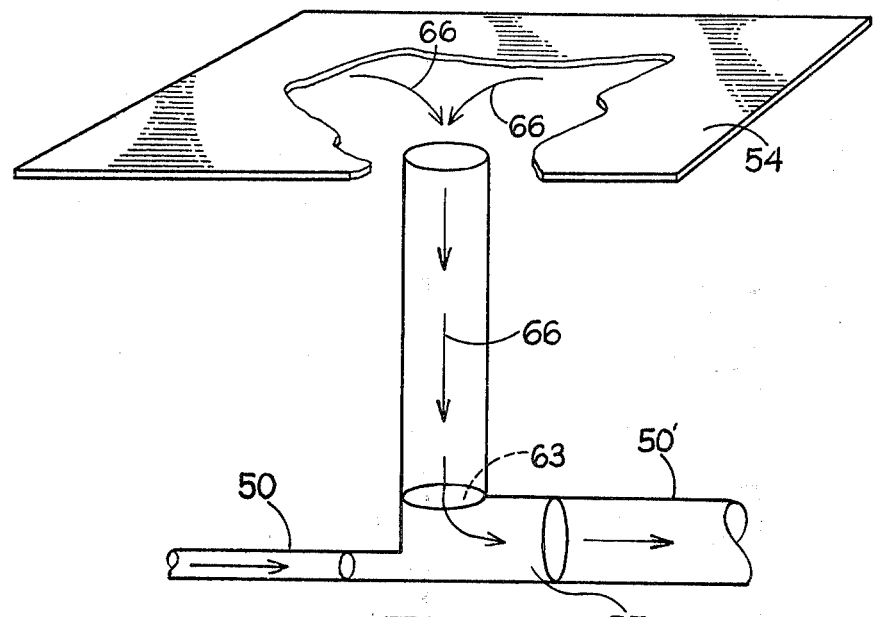
FIG. 1C is a perspective view of a venturi type tee which can form part of the overall system of FIG. 1A so as to draw down warm air along the ceiling of a room.
Figure 1B:
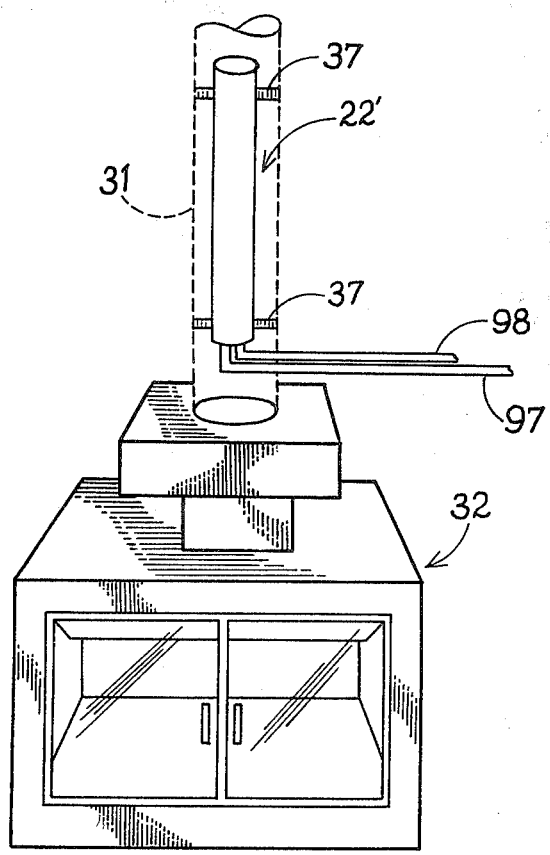
FIG. 1b is a perspective view of a free-standing heating device connected to an alternative version of the exhaust gas to air heat exchanger for the overall system shown in FIG. 1.

The heating device 32 shown in FIG. 1 can be a free-standing fireplace (such as shown in FIG. 1B) or alternatively can be a fireplace insert placed within a fireplace enclosure such as that shown in U.S. Pat. No. 4,026,264, Henriques, in FIGS. 1 and 2 thereof. The heating device may burn solid fuel such as wood or coal or alternatively, the heating device can be a furnace or boiler for a hot air or hot water heating system using oil or gas as fuel. The invention may thus be universally installed in any flue associated with any heating device.

As shown in FIG. 1, a fan 24 is controlled by controller 30. When activated, the fan causes air to flow through inlet piping 44 as shown by arrow 45. The air enters the heat exchanger 22 through an air inlet port 46 best seen in FIG. 2 for one embodiment of this heat exchanger. The air circulates through the heat exchanger as more fully detailed below and exits through air outlet port 48, again as best seen in FIG. 2. Hot air piping 50 connects to the air outlet port 48 carrying the air to wherever desired, and in the particular embodiment shown in FIG. 1, to a hot air to water heat exchanger 26. The piping and inlet piping 44 have a typical inside diameter of 1.375 inches (3.49 cm). The air flow through this piping 50 is shown by arrow 51.

This tubing may continue to have the same diameter as the air outlet port 48 or alternatively may be larger, typically up to four inches in diameter, especially when the present invention is used for hot air heating purposes such as shown in FIG. 1A. FIG. 1A replaces dotted section 29 of FIG. 1. It is seen in FIG. 1A that hot air piping or ductwork 50' is utilized for the majority of the hot air run. This ductwork is preferably four inch (10.16 cm) diameter insulated ductwork such as manufactured by Metalflex Corp., 13 E. North Avenue, Baltimore, Maryland. Such insulated ductwork has an aluminum spiral type interior with a fiberglas type insulation around this interior and a plastic type cover over the insulation. It is easily installed by homeowners, thus facilitating overall installation of the flue heat recovery system.

The ductwork 50' terminates in a room through vent 53. This vent may be mounted in a ceiling 54 as shown in FIG. 1A or may be mounted in a wall. If desired, more than one vent can be connected to ductwork 50' at spaced intervals. The vent can utilize a centrally located cone shaped baffle 55 mounted to the vent by legs 56 so as to divert and mix room air with the hot air leaving opening 58 in hot air piping 50'. A cone shaped adapter 59 may be placed between the smaller diameter hot air piping 50 and the larger diameter ductwork 50' so as to form an integral seal therebetween.

Alternatively a venturi type tee 57 may be placed between piping 50 and ductwork 50', such as shown in FIG. 1C. As there seen, a second duct 60 is connected to the perpendicular opening 63 of tee 57. This second duct preferably extends upward to a region near the ceiling 54 of the associated room. Since the hot air flow is expanding from a piping 50 to ductwork 50', a pressure drop exists at opening 63 which thus causes warm air trapped along ceiling 54 to be removed by duct 60 as shown by arrows 66. This warm air then mixes with the hot air in ductwork 50' and is delivered where desired through vent 53.

In the embodiment shown in FIG. 1, the hot air travelling through piping 50 connects to the hot air to water heat exchanger 26 and after heating the water in this heat exchanger, exits through orifice 61 into the associated room. At this point, the air temperature is still above ambient and therefore is of some space heating usefulness.

The water circulates through heat exchanger 26 due to water circulator 28, which is controlled by controller 30. The water flows in and out of the circulator as shown by arrows 62. The details on the construction of the hot air to water heat exchanger are more fully described below. The exiting hot water from heat exchanger 26 travels through piping 64 and may terminate in a domestic hot water heater 65. The return water leaves the hot water heater 65 via piping 67 and is propelled by the circulator 28. The domestic hot water for use throughout the dwelling exits through piping 68.

Alternatively, as shown in phantom in FIG. 1, the hot water travelling though piping 24 may be connected through piping 64' to baseboard heat exchanger 70; with the return water flowing through piping 67' back to the circulating pump 28 and then to the heat exchanger 26. In this embodiment, connection to a domestic hot water heater is eliminated.

Regardless of the particular end use for the heat recovered by the present invention, control circuitry is utilized which automatically responds to either the hot water to be circulated in a domestic hot water heater or in domestic baseboard heating systems, or to the air temperature of the room to be heated in the embodiment of the invention shown in FIG. 1A. To do this, the present invention utilizes a thermostat 72 either to monitor the room temperature for the configuration shown in FIG. 1A or to monitor the water temperature for the configuration shown in FIG. 1. In the hot water baseboard heating embodiment shown in phantom in FIG. 1, a room thermostat 72' is used in a manner completely analogous to that shown in FIG. 1A.

In addition to thermostat 72 or 72', the water temperature leaving the hot air to water heat exchanger 26 is monitored by thermocouple 74, this signal being transferred to controller 30 as shown by line 75. Similarly, the air temperature at the exhaust gas to air heat exchanger 22 is monitored by sensor 76 (such as a thermocouple) and this information transferred to controller 30 by line 77. Of course, any technique for monitoring temperature that generates an electrical signal proportional to temperature can be used.

The controller receives these signals and based upon a logical combination of particular preset values for various temperatures, determines when to turn ON or OFF fan 24 and water circulator 28. This is done by energizing the fan 24 through line 79 and energizing water circulator 28 through line 80. Typically, lines 79 and 80 are at 110 VAC although other voltages may be utilized depending upon the particular needs of the fan and water circulator respectively. Controller 30 in turn is energized by a source of utility AC through line 82.

The controller 30 may comprise indicators 83 and 84 for showing when the fan and pump are energized. It also typically comprises an ON and OFF switch 85 for energizing the controller.

When the controller is connected to a heating system for heating domestic hot water such as shown in FIG. 1, the activation of fan 24 and water circulator pump 28 is determined by the truth table shown in Table 1. Thus, if the water temperature within the heater 65 is below some preset value (typically between 120° to 140° F.), thermostat 72 is turned ON (switch closed) and if the air temperature set by thermocouple 76 indicates that the air near the outlet of heat exchanger 22 is above 200° F., then fan 24 is turned ON. The water circulator 28 is turned ON when the water temperature exceeds a preset temperature, typically 120° F. The water temperature sensor thermocouple 74 in the hot air to water heat exchanger 26 is also used as a safety sensor so as to turn OFF blower 24 if the water temperature exceeds a safety preset temperature, typically 180° F.

It is therefore evident that if there is a power failure such that controller 30 is inoperative, no damage can result from the present invention since the exhaust gases which continue to escape up chimney 33 can only heat air within heat exchanger 22. This hot air can cause no harm since the heated air can expand through tubing 50. An appreciable amount of hot air however will not flow since fan 24 is OFF during such a power failure. Consequently, the water within the hot air to water heat exchanger cannot overheat and thereby a failsafe mechanism is realized.

A controller for performing this operation is schematically shown in FIG. 17. Commercially available units, such as Model L8124 hydronic control unit manufactured by Honeywell Corp. of Minneapolis, Minn. can sense thermostatic water temperatures but are not able to activate fan 24. They can however be used if the fan is manually activated.

If the heating system utilizes the hot air to water heat exchanger to heat baseboard radiator 70 instead of the domestic hot water heater 75, thermostat 72' is used to sense the room temperature rather than thermostat 72 used to sense the water temperature within the water tank.

TABLE 1

| Hot Air Temp (Sensor 76) preset (nom. 200° F.) | Hot Water Thermostat 72 ON (calling for heat, nom. 120° F.) OFF (not calling for heat) | Hot Water Temp (Thermocouple 74) first preset (nom. 120° F.) safety preset (nom. 180° F.) | FAN 24 | Water Circulator 28 |
|---|---|---|---|---|
| >preset | ON | >first preset <safety preset | ON | ON |
| <preset | ON | >first preset | ON | OFF |
| >preset | OFF | <safety preset | OFF | OFF |
| ANY TEMP | ON or OFF | >safety preset | OFF | ON |
| <preset | ON or OFF | <safety preset | OFF | OFF |

TABLE 2

| Hot Air Temp (Thermostat 76) Preset @ 200° F. (°F.) | Room Thermostat 72 ON (calling for heat), OFF (not calling for heat) | FAN 24 |
|---|---|---|
| >preset | ON | ON |
| >preset | OFF | OFF |
| <preset | ON | OFF |
| <preset | OFF | OFF |

The overall control performed by controller 30 is the same as set forth in Table 1 except for the difference in sensed temperature by thermostat 72'. This temperature would, of course, be a typical room temperature.

If the embodiment of the invention shown in FIG. 1A is utilized, the hot air from hot air piping 50 is used for direct hot air heating purposes through vent 53. Here the thermostat 72' indicates when additional hot air is required in the room to be heated. In this configuration, sensor 76 can be a thermostat connected in series with thermostat 72 (see FIG. 17A). The controller 30 in this configuration is then only the thermostat relay connected to fan 24.

The circumstances for turning the fan ON and OFF in response to the sensed temperatures of thermostats 72' and 76 are set forth in Table 2. As noted in Table 2, if thermostat 72' is closed indicating that heat is needed and if the air temperature of heat exchanger 22 (thermostat 76) indicates that the heat exchanger hot air outlet is 200° F. or higher, then the fan is turned ON. Thus, the heat is delivered only when required and only when it is available from the heat exchanger 22. If there is no fire within the heating device 32, the fan will not be activated thus conserving energy and also preventing an undesired draft. A fail-safe operation is again achieved since no damage results from a power failure deactivating fan 24.

In all the situations shown in Tables 1 and 2, hysteresis dead bands are typically incorporated in the thermostats and controller to avoid rapid ON's and OFF's.

It is thus seen that the present system provides a self-regulating system which operates in a failsafe manner. This is in contrast to many prior art devices, especially those in which hot water is heated by the exhaust gases in a flue, where, for a heating device using solid fuel, a power outage can cause the water within the heat exchanger to become overheated.

The Exhaust Gas to Air Heat Exchanger

Figure 5:
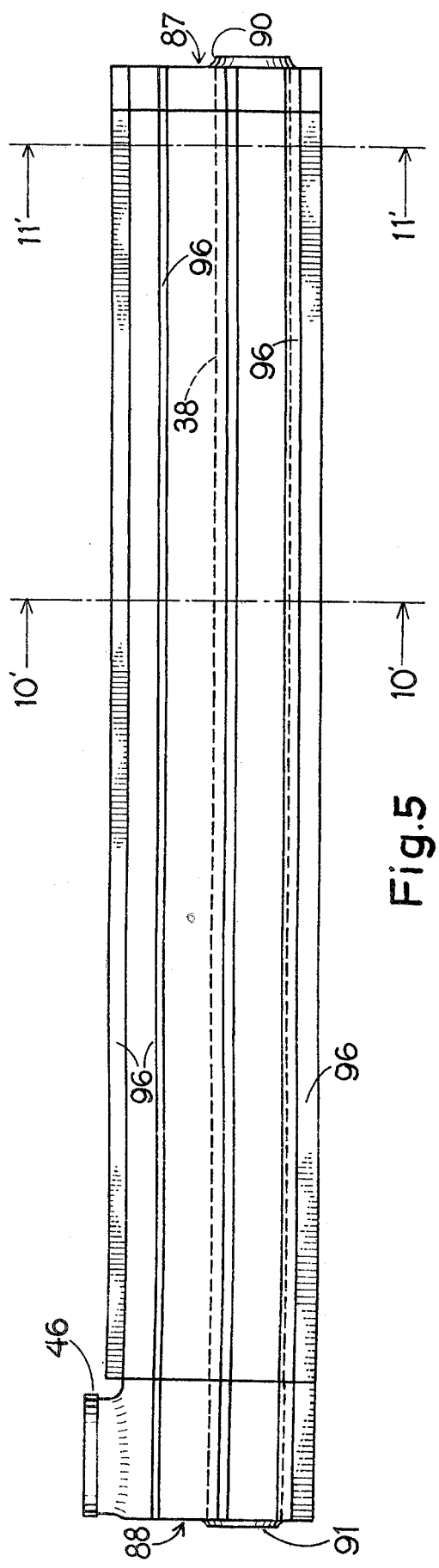
FIG. 5 is a side view of the heat exchanger shown in FIG. 2 taken in the same plane as that defined by the inlet and outlet air ports of the heat exchanger and also showing in phantom the exhaust gas conduit passing through the heat exchanger.
Figure 6:
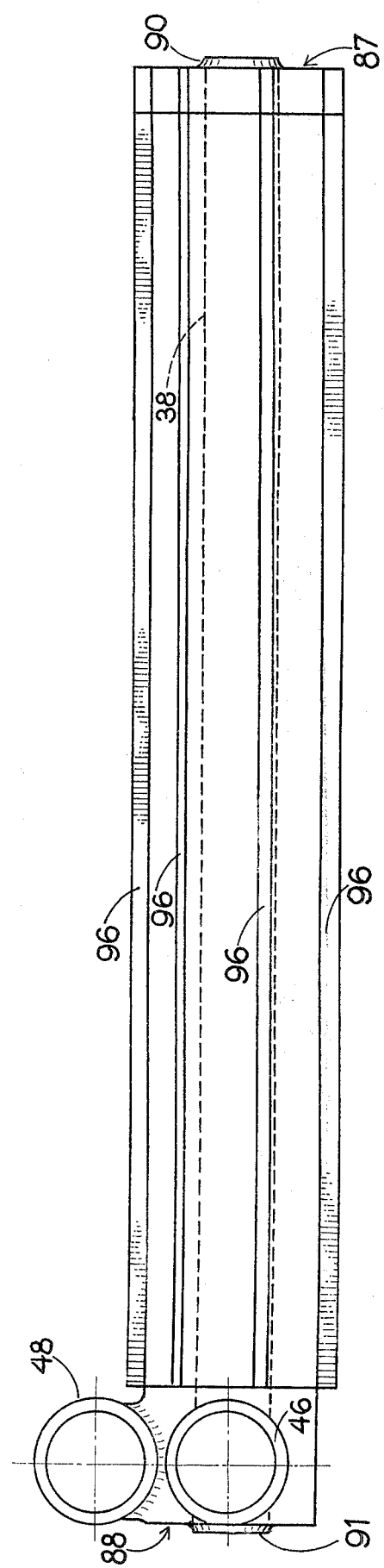
FIG. 6 is a side view of the heat exchanger shown in FIG. 2 with the cylinder rotated about its axis approximately 90° with respect to that shown in FIG. 5 and thereby showing the air inlet and outlet ports normal to the page.
Figure 13:
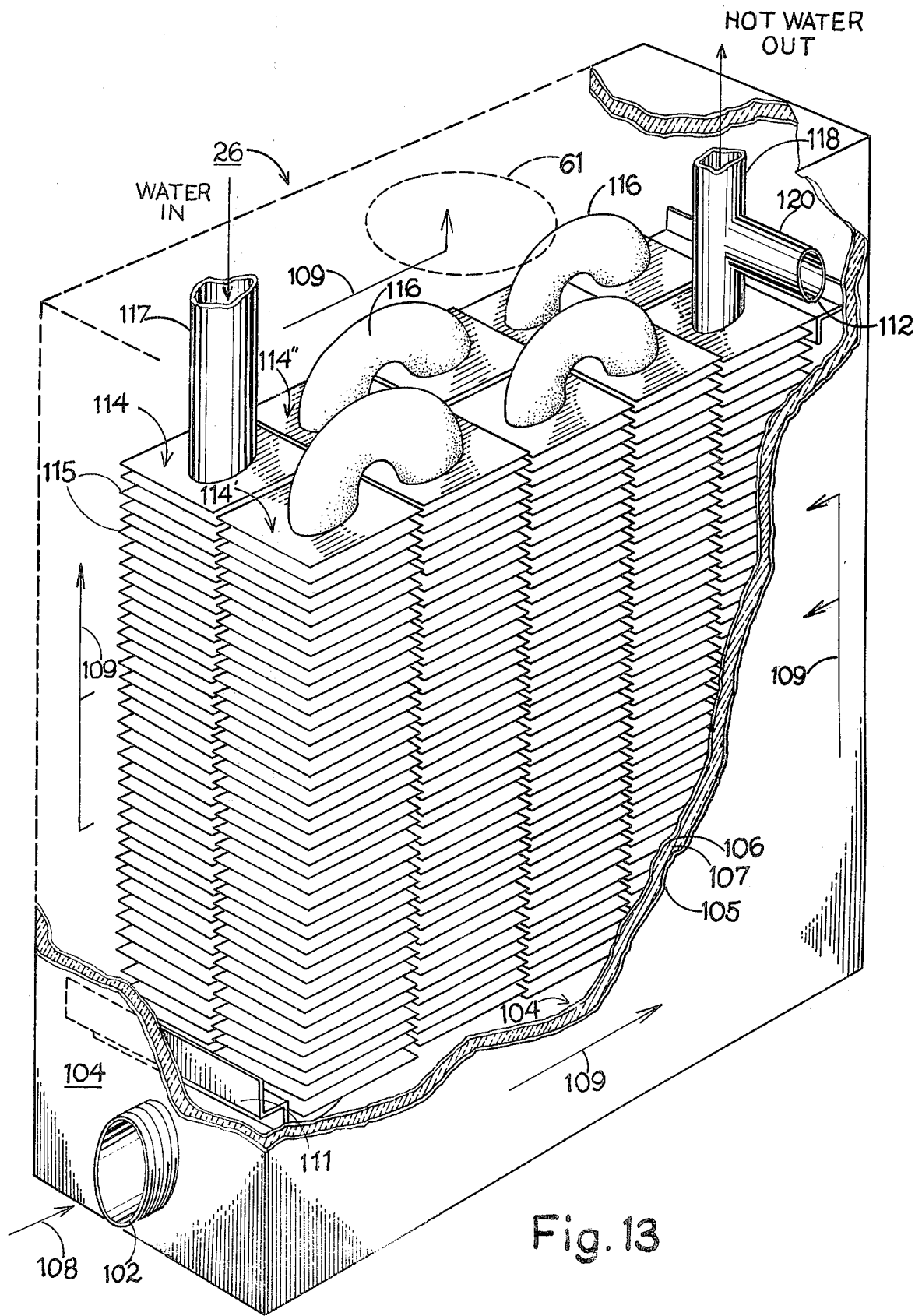
FIG. 13 is a perspective, partially broken away view of the hot air to water heat exchanger shown in FIG. 1 illustrating the hot air inlet port, the hot air outlet port (in phantom), the cold water inlet port and the hot water outlet port as well as the region for placement of a thermocouple or other heat sensing device for determining the temperature of the water leaving the heat exchanger.
Figure 16:
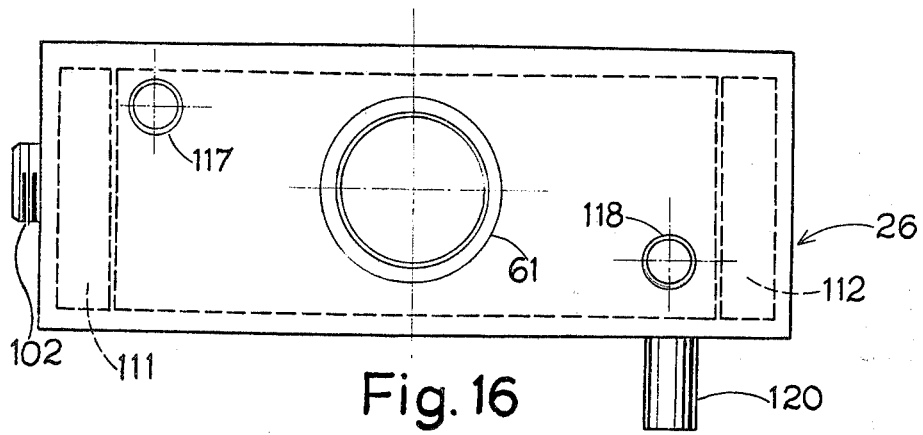
FIG. 16 is a top plan view of the heat exchanger shown in FIGS. 13 and 14 basically along line 16—16 of FIG. 14, illustrating in phantom the rectangular cross-sectional area of the core as well as the outward placement of the upper and lower air baffles, and showing in conjunction with FIGS. 13 and 15 that the outer wall of the hot air to water heat exchanger has a thickness for insulating its outer surface, thereby promoting better heat transfer between the hot air and water.

FIGS. 2, 3, 4, 5 and 6 illustrate in detail the exhaust gas to air heat exchanger 22. As shown in these FIGURES, the heat exchanger comprises an outer cylindrical shell 42 with an upper end cap 87 and a lower end cap 88. Passing completely through these end caps is an exhaust gas conduit 38 having upper opening 90 and lower opening 91 as best seen in FIGS. 3, 5 and 6. The exhaust gases flow through this conduit as shown in FIGS. 1 and 2, thereby providing an interior area within the heat exchanger 22 that is maintained at a temperature near that of the exhaust gases. Furthermore, an air inlet tube 92 having an interior opening 93 is connected at its lowermost end through the air inlet port 46 as best seen in FIG. 2. By having this tube extend into the heat exchanger, the incoming air to the heat exchanger must flow back along the entire length of the heat exchanger before it is able to exit through outlet port 48. This is shown diagrammatically by arrows 95 shown in FIG. 2. Since outlet port 48 is the only other opening within the heat exchanger associated with the inlet port 46, all of the air which enters port 46 must pass out of port 48. The heat exchanger is sealed between air flowing within it and the exhaust gases flowing around it and through the exhaust gas conduit 38, insuring complete isolation between the exhaust gases and the heated air.

To enhance the heat transfer capability of the heat exchanger 22, a plurality of longitudinally extending ribs 96 are fastened about the periphery of cylindrical shell 42 as best seen in FIG. 2. These ribs are typically fastened to the shell by means of spot welding although any other technique may be utilized which is able to maintain high thermal conductivity between the shell and the ribs. The ribs are fabricated from a thermoconductive material such as steel, as is shell 42 and the other components of the heat exchanger 22. Aluminized steel may also be used for the heat exchanger components especially when the exhaust gases can exceed 700° F.

Positioned and mounted about the outer termination of radial ribs 96 is a screen 39 as best seen in FIGS. 2 and 3. The screen 39, by being spaced away from shell 42 forms an air space 40 therebetween as best seen in FIG. 4. The air space provides a region where the exhaust gases can move and pass in and out of the screen, transferring heat to the screen and the cylindrical shell spaced beneath the screen. This heat transfer is conducted to the air within the heat exchanger through ribs 96 and cylindrical shell 42.

In the preferred embodiment of the present invention, the heat exchanger 22 has an overall length of approximately 35 inches (88.9 cm) and an outside diameter of the screen of 4½ inches (11.43 cm). The outside diameter of cylindrical wall 42 is approximately 3½ inches (8.89 cm) and thus an air space between the cylindrical shell and the screen of approximately ½ (1.27 cm) is maintained throughout the entire periphery of the device. The exhaust gas conduit has a typical inside diameter of 1⅜ inches (3.49 cm) while the typical inside diameter of air inlet port 46 and air outlet port 48 is approximately 1-11/16 inches (4.29 cm). The cylindrical shell 42 is typically fabricated from sixteen gauge steel.

As best seen in FIGS. 1-4, the heat exchanger 22 is positioned within flue 31 by radially extending fins 37, typically three fins at the top and bottom as best seen in FIGS. 2 and 3. The fins contact the inner periphery of the flue 31 and may be adjusted by bending to accommodate variations in the size of the flue. The fins are typically fabricated from sixteen gauge steel and provide additional conductivity to the heat exchanger.

Since the heat exchanger 22 has a cross-sectional area of approximately 5.5 square inches (35.5 sq. cm), it is typical that the flue pipe 31 provides for this additional cross-sectional area to minimize occluding the flow of exhaust gases up chimney 33. Typically, if the heating device 32 uses a 7 inch diameter (17.8 cm) flue, an 8 inch (20.3 cm) diameter flue can be used instead. The need for going to a larger size flue depends somewhat on the original flue size, although a one inch (2.54 cm) increase in overall diameter is sufficient to prevent any appreciable occluding of exhaust gas flow.

Due to the fact that the heat exchanger is essentially mounted within flue 31, the exhaust gases have a higher probability of flowing in the vicinity of the interior periphery of flue 31 than they otherwise would without the heat exchanger installed. This gives rise to the beneficial effect of maintaining the interior walls of the flue at a higher temperature than otherwise would be realized. This higher temperature in turn minimizes solid deposits from being formed, such as creosote when wood is used in the heating device. It has also been found that due to the air space 40 between screen 39 and cylindrical shell 42 that the heat exchanger is also maintained at a relatively high temperature approximating that of the exhaust gases. Consequently, solid deposit deposition on the heat exchanger is also minimized. The overall result is a heat exchanger having a fairly high thermal efficiency able to deliver an appreciable amount of heated air out of air outlet port 48.

It has been experimentally found that this air temperature typically is in excess of 250° F. for a heating device burning wood, and that temperatures of 500° F. to 600° F. are common. Such temperatures are also typically obtained when the heating device uses coal, oil or gas.

Further details on the construction of the exhaust gas to air heat exchanger 22 is best seen in FIGS. 2, 5, 10 and 11. As shown in FIG. 5, cross-sectional views of FIGS. 10 and 11 illustrate the internal placement of the exhaust gas conduit 38 and the air inlet tube 92.

An alternative version of the exhaust gas to air heat exchanger 22 is shown in FIGS. 7 and 8, denoted by the numeral 22'. The overall construction is the same except that the air inlet port 46 and the air outlet port 48 are in a plane parallel to the lower opening 91 of exhaust gas conduit 38. FIG. 9 is an end view of this alternative embodiment of the exhaust gas to air heat exchanger and illustrates the placement of the air inlet port 46' and the air outlet port 48' in combination with the lower opening 91 of exhaust gas conduit 38. Corresponding placements of these ports are shown in FIGS. 7 and 8 as well as cross-sectional views as shown in FIGS. 10 and 11. In this particular embodiment, the air inlet and outlet openings extend downwardly in an axis parallel to the longitudinal axis of the cylindrical shell 42 and is principally used when the heat exchanger is placed within a flue associated with a free-standing fireplace enclosure having elbow pipes 97 and 98 as best seen in FIG. 1B.

Otherwise the construction of the exhaust gas to air heat exchanger 22' is the same as that for the heat exchanger 22 shown in FIGS. 2, 5, 6, 10 and 11. Furthermore, the placement of this heat exchanger within the flue pipe corresponds to that shown in FIGS. 3 and 4 with respect to the heat exchanger 22.

An alternative to the use of the exhaust gas to air heat exchanger 22 or 22' is shown in FIG. 12 which illustrates a heating device 32' which can be a fireplace insert or free-standing fireplace. This heating unit incorporates an exhaust gas to air heat exchanger 22" in its upper region. This upper region comprises a plurality of baffles 99 which cause the incoming air to circulate in a back and forth motion as shown by arrows 100 so that air exiting outlet port 48 has been heated by the exhaust gases resident within firebox 29. This embodiment of the heat exchanger can not be retrofitted to an existing heating device but can be fabricated into a new heating device.

The Hot Air to Water Heat Exchanger

Details of the construction for the hot air to water heat exchanger 26 is best seen in FIGS. 13-16. In its preferred embodiment, its exterior is a generally rectangular solid having a hot air inlet port 102 which penetrates through one of the exterior walls 104 of the heat exchanger 26. As is apparent in FIG. 15, the exterior walls have a sandwich like construction with an exterior metallic surface 105, an interior metallic surface 106 and an insulating material 107 spaced therebetween. In this manner, the exterior surface 105 is maintained at a relatively cool temperature since the heat transfer through the walls 104 is minimized. This further promotes heat transfer between the hot air and water circulating through heat exchanger 26.

The incoming hot air as shown by arrow 108 travels through the heat exchanger generally as shown by arrows 109 so as to ultimately exit through an air outlet port 61 after transferring some of its heat to the water circulating through heat exchanger 26. This air flow is promoted through use of lower and upper baffles 111 and 112 respectively. Typically the incoming air temperature is between 500° to 600° F. and a temperature drop of about 250° F. is typical for the air exiting through port 61.

The water passes through a plurality of interconnected hot air to water elements 114, each comprising a plurality of metallic fins 115 for promoting heat transfer from the hot air to the water circulating within pipes 116. These pipes extend throughout the length of each of the heat exchanger elements 114. The water thus flows through all the stacks until exiting through the hot water outlet pipe 118.

It should be noted that the heat exchanger stacks 114 may be fabricated from baseboard radiators used for domestic hot water heating and thus, the overall construction of the heat exchanger 26 is straightforward and inexpensive.

The hot air to water heat exchanger 26 further preferably incorporates a tube 120 for insertion of a temperature sensing device such as a thermocouple or bimetallic thermostat switch 74 which senses the temperature of the hot water exiting from outlet pipe 118. This temperature information is fed to the controller 30 for determining when to activate water circulator 28 as well as fan 24 (see FIG. 1).

The water circulator 28 may be any commercially available unit such as Model 007F2 manufactured by Taco Inc. of Cranston, R.I.

The fan 24 may also be any commercially available unit, especially those used for powering vacuum cleaners. A typical fan has a 1-inch (2.54 cm) adjustable outlet; the fan operating at approximately 22,250 RPM's. A typical manufacturer is Ametec-Lamb Electric Division of Kent, Ohio.

Figures 14, 15:
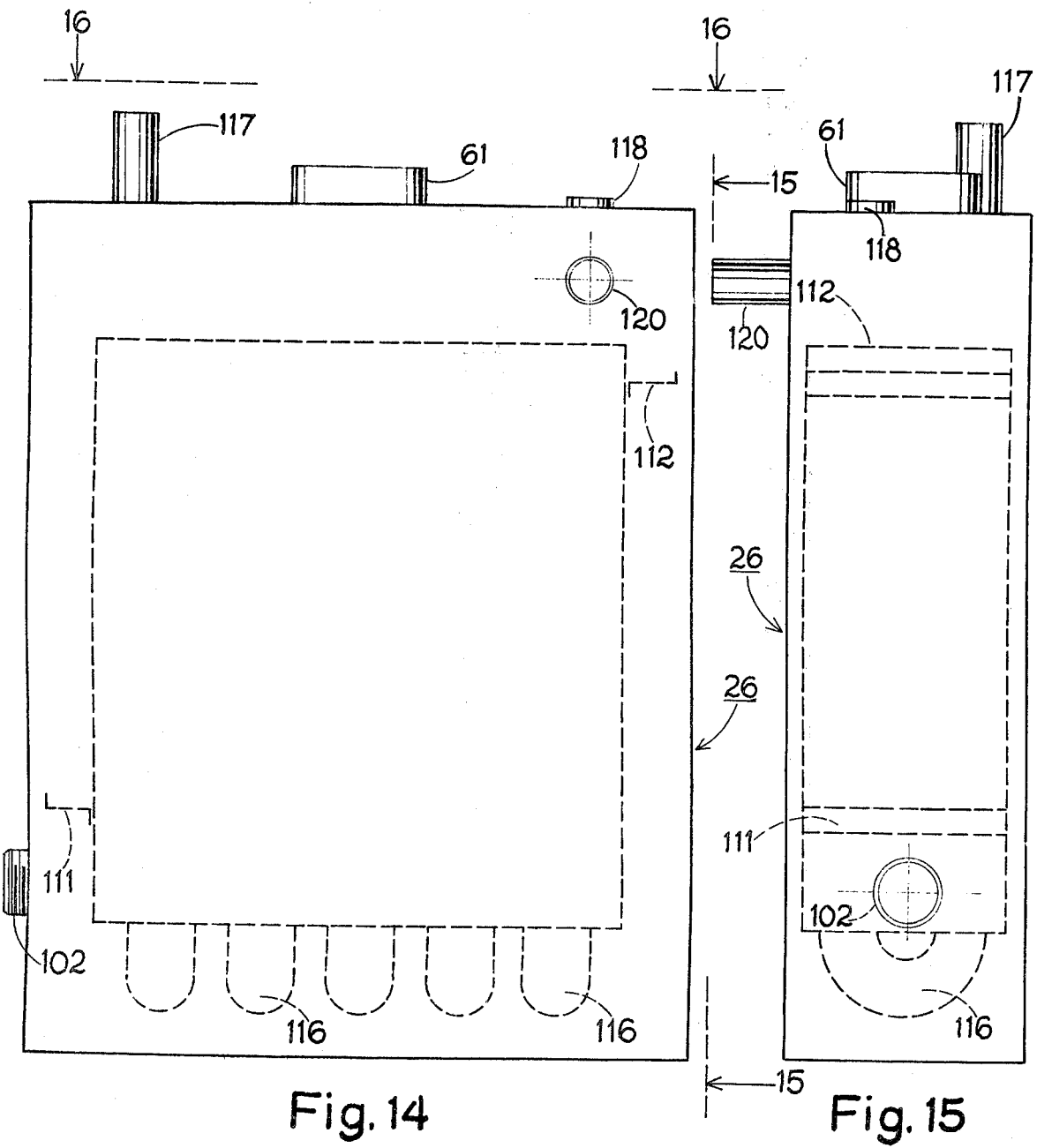
FIG. 14 is a front elevational view of the hot air to water heat exchanger shown in FIG. 13, illustrating in phantom the rectangular area of the heat exchanger core as well as the baffles used within the core for causing the hot air to flow throughout the fin structure of the core.
FIG. 15 is a side elevational view of the heat exchanger taken along line 15—15 of FIG. 14, illustrating in phantom the hot air inlet port on the other side of the heat exchanger as well as the upper and lower baffles shown in FIG. 14.

The preferred dimensions for the hot air to water heat exchanger 26 are that it has, for the view shown in FIG. 14, an overall width of approximately 11.5 inches (29.2 cm), an overall height of approximately 14 inches (35.6 cm), and an overall depth of 4½ inches (11.4 cm). The air inlet port 102 has a typical inside diameter of 1-11/16 inches (4.29 cm) while the air outlet port 61 has a typical diameter of 3 inches (7.5 cm). The water inlet pipe 117 and the water outlet pipe 118 as well as pipes 116 interconnecting elements 114 have a typical diameter of ⅞ inch (2.22 cm). This piping is commonly used in domestic plumbing.

Figure 18:
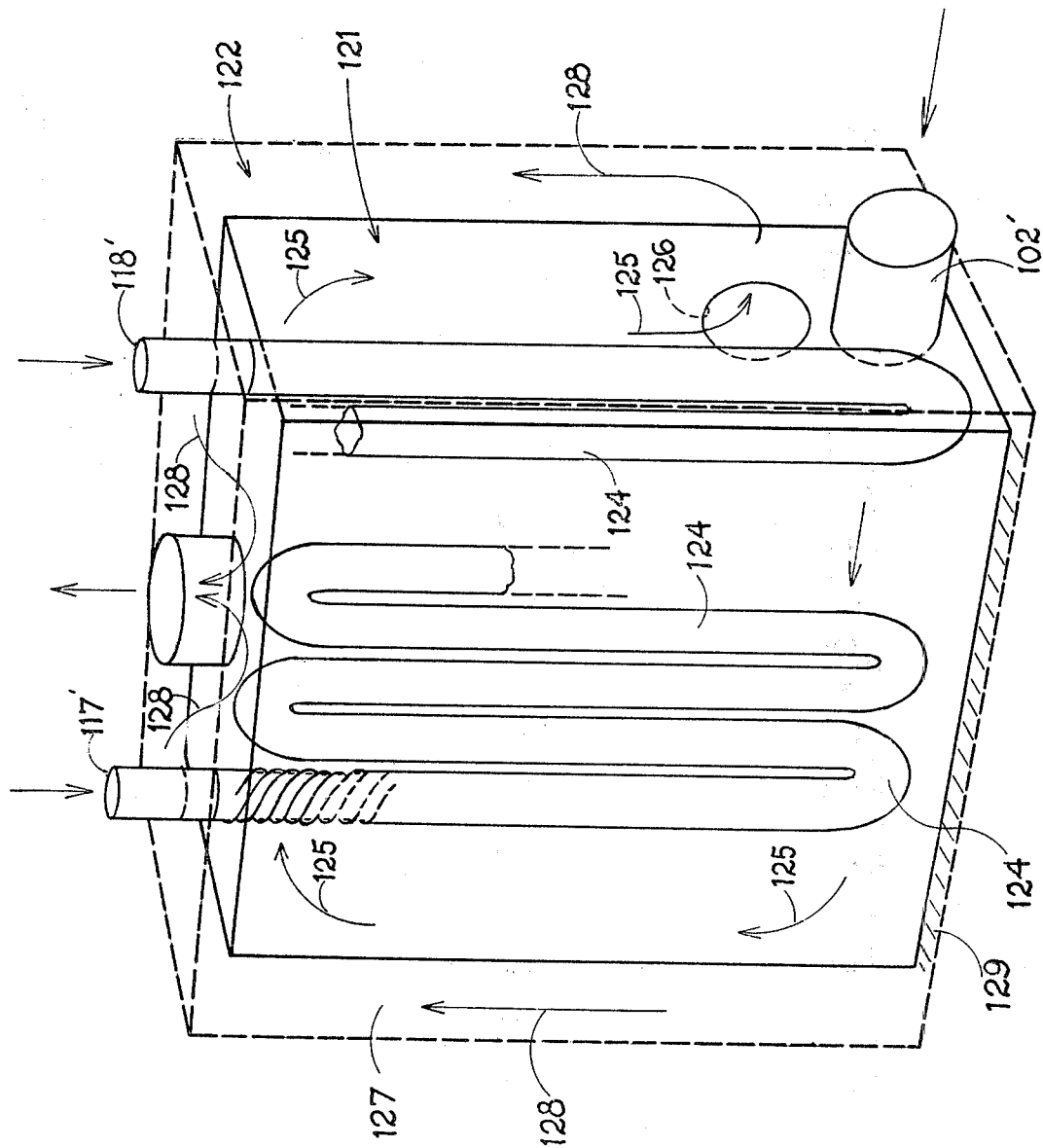
FIG. 18 is a perspective view, partially in phantom, of an alternative embodiment of the hot air to water heat exchanger using accordion-like bent spiral tubing instead of finned heat transfer elements.

An alternative hot air to water heat exchanger 26' is shown in FIG. 18. In this embodiment, the heat exchanger utilizes an inner shell 121 and an outer shell 122. A hot air inlet port 102' protrudes through one side of outer shell 122 so as to pass hot air into inner shell 121. Within inner shell 121 is an accordion-like folded tubing 124 terminating at one end with a water inlet pipe opening 117' and at its other end with a hot water outlet pipe opening 118'. The tubing may have a spiral exterior surface to increase its heat transfer capability.

The hot air entering inner shell 122 flows around the folded tubing 124 in a manner shown by arrows 125 and exits out of the inner shell through outlet opening 126. This opening transfers the exiting warm to the plenum 127 defined by inner shell 121 and outer shell 122. The exiting air tends to flow in a manner shown by arrows 128 so as to exit through outlet orifice 61'. Insulation 129 may be placed between the bottom surface of inner shell 121 and outer shell 122.

The inner shell is preferably 8.25 inches in length (20.95 centimeters), 4 inches in depth (10.16 centimeters), and 12 inches in height (20.48 centimeters). The outer shell preferably has a length of 10 inches (25.4 centimeters), a depth of 4.75 inches (12.06 centimeters), and a height of 13 inches (33.02 centimeters). The water tubing 124 preferably has a diameter of 0.75 inches (1.90 centimeters). The hot air inlet port 102 preferably has a diameter of 1.25 inches (3.17 centimeters) as does the outlet opening 126 of inner shell 121. The inner and outer shells may be fabricated from sheet metal. The tubing 124 is preferably made from copper. The insulation preferably has a thickness of 0.25 inches (0.63 centimeters).

Thus what has been described is a flue heat recovery system which can be automatically set to provide either domestic hot water or hot air to a desired temperature while operating in a fail-safe and efficient manner. By utilizing an exhaust gas to air heat exchanger within an existing flue, the otherwise wasted heat from the exhaust gases exiting through the flue is retrieved as usable heat while the overall system is able to operate even during power failures in a completely safe manner.

It will thus be seen that the objects set forth above, and those made apparent from the preceding description, are efficiently attained and, since certain changes may be made in the above construction without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A flue heat recovery system for use with a heating device (32) generating exhaust gases from combustion of a fuel, the exhaust gases exiting through a flue (31) comprising:

(A) an exhaust gas to air heat exchanger (22) having means for mounting within the flue of the heating device, the exhaust gas to air heat exchanger comprising;
 (1) a cylindrical shell (42) with two caps (87,88) one at either end of the shell, the cylindrical shell further having an air inlet port (46) and an air outlet (48) port formed therethrough,
 (2) an exhaust gas conduit having openings (90, 91) formed through each cap of the heat exchanger so as to allow exhaust gas from the heating device to pass through the interior of the heat exchanger in a non-mixing relationship with the air circulating in the heat exchanger, (3) an air inlet tube (92) connected to the air inlet port (46), the air inlet tube extending within the cylindrical shell along substantially the majority of the length of the cylindrical shell so as to force the incoming air to circulate throughout the majority of the length of the heat exchanger before exiting from the air outlet port (48), (4) a plurality of thermally conductive radial ribs (96) attached to the periphery of the cylindrical shell, and (5) a screen (39) having a cylindrical shape attached to the outer periphery of the radial ribs, the screen having a length substantially equal to that of the cylindrical shell so as to define an air space between itself and the cylindrical shell and thereby promote heat transfer from the exhaust gases to the air within the heat exchanger;

(B) a fan, (24) interconnected to the air inlet port of the exhaust gas to air heat exchanger for forcing air through the heat exchanger so as to exit out of the air outlet port;

(C) a hot air to water heat exchanger (26) interconnected to the outlet port of the exhaust gas to air heat exchanger, having a water inlet pipe (117) and a hot water outlet pipe (118) for passing water therebetween so as to have heat transfer from the hot air entering the hot air to water heat exchanger from the exhaust gas to air heat exchanger;

(D) a water circulator (28), interconnected to the water inlet pipe of the hot air to water heat exchanger, for forcing water through the hot air to water heat exchanger;

(E) means for connecting the hot water outlet pipe of the hot air to water heat exchanger to a device to be heated by the hot water from this heat exchanger and for circulator water back to the water circulator;

(F) first temperature sensing means for sensing the temperature of the water exiting from the hot air to water heat exchanger;

(G) second temperature sensing means for sensing the air temperature in the vicinity of the exhaust gas to air heat exchanger;

(H) third temperature sensing means for sensing the ambient temperature of a region to be heated by the hot water from the hot air to water heat exchanger; and (I) means, connected to the fan, water circulator, and first, second and third temperature sensing means for logically combining the sensed temperatures from said first, second and third temperature sensing means so as to control energization and de-energization of the fan and water circulator.

2. A flue heat recovery system as defined in claim 1, wherein the exhaust gas to air heat exchanger means (37) for mounting within the flue includes means for radially positioning this heat exchanger centrally within the flue of the heating device so that a majority of the exhaust gases pass in proportionally greater proximity to the interior wall of the flue than if the heat exchanger was not placed within the flue, thereby maintaining the flue at a temperature approaching the temperature of the exhaust gases, this temperature higher than it otherwise would be without the exhaust gas to air heat exchanger mounted therein, and also maintaining the heat exchanger at a temperature near that of the exhaust gases, and thereby minimizing deposits on the interior wall of the flue and the heat exchanger; whereby more efficient heat transfer to the heat exchanger and flue is realized.

3. A flue heat recovery system as defined in claim 2, wherein the air inlet port and air outlet port project perpendicularly outwardly from the longitudinal axis of the heat exchanger and wherein an inlet pipe (44) interconnects the fan to the air inlet port and wherein a hot air pipe (50) interconnects the hot air to water heat exchanger to the outlet port of the exhaust gas to air heat exchanger.

4. A flue heat recovery system as defined in claim 2, wherein the heating device is a free-standing fireplace enclosure (32) having first and second elbow pipes (97, 98) for interconnection to the fan and hot air to water heat exchanger respectively, and wherein the air inlet port (46') and outlet port (48) of the exhaust gas to air heat exchanger are in a plane parallel to that of the heat exchanger cap and dimensioned for placement onto the elbow pipes of the free-standing fireplace enclosure.

5. A flue heat recovery system as defined in claims 1, or 2, wherein the hot air to water heat exchanger (26) comprises an insulated outer surface defining a hollow interior, a plurality of serially interconnected heat exchanger stacks (114) positioned in said hollow interior, the heat exchanger stacks terminating in the water inlet pipe and hot water outlet pipe.

6. A flue heat recovery system as defined in claims 1, or 2, wherein the third temperature sensing means comprises a thermostat that is in an OFF state if the ambient sensed temperature is greater than a first preset temperature, and is in an ON state if the ambient sensed temperature is less than the preset temperature, and wherein the means for logically combining the sensed temperatures from said first, second, and third temperature sensing means so as to control energization and de-energization of the fan and water circulator, comprises means for sensing a second preset temperature and a third, safety preset temperature of the first temperature sensing means, and for sensing a fourth preset temperature of the second temperature sensing means, as well as for sensing the ON or OFF state of the third temperature sensing means, wherein any or all of the preset temperatures may include a dead band range for a hysteresis effect, and wherein it performs said control according to the following truth table:

| First Temp. Sensing Means | Second Temp. Sensing Means | Third Temp. Sensing Means | Fan | Water Circulator |
|---|---|---|---|---|
| >second preset <third preset | >fourth preset | ON | energized | energized |
| >second preset | <fourth preset | ON | energized | de-energized |
| <third preset | >fourth preset | OFF | de-energized | de-energized |
| >third preset | ANY TEMP | ON or OFF | de-energized | de-energized |
| <third preset | <fourth | ON or OFF | de-energized | de-energized |

-continued

| First Temp. Sensing Means | Second Temp. Sensing Means | Third Temp. Sensing Means | Fan | Water Circulator |
|---|---|---|---|---|
| | preset | | | |

7. A flue heat recovery system as defined in claims 1, or 2, wherein the flue (31) has an exhaust gas opening perpendicular to its longitudinal axis, the flue heat recovery system further comprising a flue extension (34) having a first open end and a second end, a cap (36) connected to the second end to seal this end of the flue extension, the first end connected to the flue (31) so as to form a dead exhaust gas space in the flue extension, and wherein the exhaust gas to air heat exchanger further has means for being partially mounted within the flue extension so that the exhaust gases have greater residence time in proximity to the exhaust gas to air heat exchanger and therefore more efficient heat transfer of heat to this heat exchanger.

8. A flue heat recovery system as defined in claim 1, wherein the region to be heated by the hot water from the hot air to water heat exchanger is a hot water heater (65), and wherein the third temperature sensing means senses the ambient temperature of the water in the hot water heater, and wherein the device heated by the hot water from the hot air to water heat exchanger is this hot water heater.

9. A flue heat recovery system as defined in claim 1, is a room, wherein the device to be heated by the hot water from the hot air to water heat exchanger is a series of hot water radiators (70) positioned to this said room.

10. A flue heat recovery system comprising:
(A) a heating device (32') having an outside enclosure, a firebox (29) for burning a fuel therein, means for supplying fuel to the firebox, and an integral baffled upper enclosure exhaust gas to air heat exchanger (22') in thermal association with the upper portion of the firebox so as to be conductively heated by the exhaust gases in the firebox, the baffled enclosure having an air inlet port (46) and an air outlet port (48) for the passage of air therebetween and a plurality of interposed baffles extending substantially planarly above upper portion of the firebox;
(B) a fan, interconnected to the air inlet port of the exhaust gas to air heat exchanger for forcing air through the heat exchanger so as to exit out of the air outlet port;
(C) a hot air to water heat exchanger interconnected to the outlet port of the exhaust gas to air heat exchanger, having a water inlet a pipe and a hot water outlet pipe for passing water therebetween so as to have heat transfer from the hot air entering the hot air to water heat exchanger from the exhaust gas to air heat exchanger;
(D) a water circulator, interconnected to the water inlet port of the hot air to water heat exchanger, for forcing water through the hot air to water heat exchanger;
(E) means for connecting the hot water outlet port of the hot air to water heat exchanger to a device to be heated by the hot water from this heat exchanger and for circulatory water back to the water circulator;
(F) first temperature sensing means for sensing the temperature of the water exiting from the hot air to water heat exchanger;
(G) second temperature sensing means for sensing the air temperature in the vicinity of the exhaust gas to air heat exchanger;
(H) third temperature sensing means for sensing the ambient temperature of a region to be heated by the hot water from the hot air to water heat exchanger; and
(I) means, connected to the fan, water circulator, and first, second and third temperature sensing means for logically combining the sensed temperatures from the first, second and third temperature means so as to control energization and de-energization of the fan and water circulator.

11. A flue heat recovery system as defined in claim 10, wherein the third temperature sensing means comprises a thermostat that is in an OFF state if the ambient sensed temperature is greater than a first preset temperature, wherein any or all of the preset temperatures may include a deadband range for a hysteresis effect, and wherein the means for logically combining the sensed temperatures from said first, second, and third temperature sensing means so as to control energization and de-energization of the fan and water circulator, comprises means for sensing a second preset temperature and a third, safety preset temperature of the first temperature sensing means, and for sensing a fourth preset temperature of the second temperature sensing means, as well as for sensing the ON or OFF state of the third temperature sensing means, and is in an ON state if the ambient sensed temperature is less than the preset temperature, and wherein it performs said control according to the following truth table:

| First Temp. Sensing Means | Second Temp. Sensing Means | Third Temp. Sensing Means | Fan | Water Circulator |
|---|---|---|---|---|
| >second preset <third preset | >fourth preset | ON | energized | energized |
| >second preset | <fourth preset | ON | energized | de-energized |
| <third preset | >fourth preset | OFF | de-energized | de-energized |
| >third preset | ANY TEMP | ON or OFF | de-energized | de-energized |
| <third preset | <fourth preset | ON or OFF | de-energized | de-energized |

12. A flue heat recovery system for use with a heating device generating exhaust gases from combustion of a fuel, the exhaust gases exiting through a flue, comprising:

(A) an exhaust gas to air heat exchanger comprising a cylindrical shell with two caps, one at either end of the shell, an exhaust gas conduit passing through each cap of the heat exchanger so as to allow exhaust gas from the heating device to pass through the interior of the heat exchanger in a non-mixing relationship with the air circulating in the heat exchanger, an air inlet port connected through the cylindrical shell for the receipt of air, an air outlet port connected through the cylindrical shell for the exiting of air heated within the heat exchanger, an air inlet tube connected to the air inlet port, the pipe extending within the cylindrical shell along substantially the majority of the length of the cylindrical shell so as to force the incoming air to circulate throughout the majority of the length of the heat exchanger before exiting from the air outlet port, a plurality of thermally conductive radial ribs attached to the periphery of the cylindrical shell in a thermally conductive manner, and a screen having a cylindrical shape attached to the outer periphery of the radial ribs, the screen having a length substantially equal to that of the cylindrical shell so as to define an air space between itself and the cylindrical shell and thereby promote heat transfer from the exhaust gases to the air within the heat exchanger;

(B) a fan, interconnected to the air inlet port of the exhaust gas to air heat exchanger for forcing the air through the heat exchanger so as to exit out of the air outlet port;

(C) piping, having first and second ends, connected to the air outlet port at the first end for transferring the heated air from the exhaust air to heat exchanger to an area to be heated by this heated air;

(D) a vent, connected to the second end of the piping for distributing the air to a desired region;

(E) first temperature sensing means for sensing the air temperature in the vicinity of the exhaust gas to air heat exchanger;

(F) second temperature sensing means for sensing the ambient temperature of the region to be heated by the hot air exiting from the vent; and (G) means, connected to the fan and the first and second temperature sensing means for logically combining the sensed temperatures from the first and second temperature sensing means so as to control energization and de-energization of the fan.

13. A flue heat recovery system as defined in claim 12, wherein the vent comprises a baffle positioned about an opening in the vent for the passage of hot air therethrough, the baffle having a cone-shape so as to diffuse and mix the exiting hot air from the vent with the air in the region to be heated.

14. A flue heat recovery system as defined in claim 12 or 13, wherein ductwork is interconnected between the piping connected to the air outlet port of the heat exchanger at one end and to the vent at its other end, the ductwork having an interior air passageway greater in cross-sectional area than the piping, and the ductwork also having a thermally insulated outer shell for minimizing heat transfer through the walls of the ductwork.

15. A flue heat recovery system as defined in claim 14 further comprising a venturi-type tee having a first size opening at one end, a second, larger size opening along an axis parallel to the first opening, and a third opening having a size larger than the first opening and substantially similar to the second opening, the third opening in a plane substantially perpendicular to the plane of the first and second openings, the first opening interconnected to the piping from the air outlet port of the exhaust gas to air heat exchanger, the second opening connected to the ductwork and furthest from the vent, and a second duct adapted to extend upwardly near the ceiling of an associated room, the ductwork having an open upper end, and its lower end also open for connection to the third opening in the venturi-type tee so as to draw down room air from near the ceiling when hot air is forced through the first and second openings of the venturi-type tee.

16. A flue heat recovery system as defined in claims 12 or 13, wherein the exhaust gas to air heat exchanger means for mounting within the flue includes means for radially positioning the heat exchanger centrally within the flue so that a majority of the exhaust gases pass in proportionally greater proximity to the interior wall of the flue than if the heat exchanger were not placed within the flue, thereby maintaining the flue at a higher temperature approaching the temperature of the exhaust gases, this temperature higher than it otherwise would be without the exhaust gas to heat air exchanger mounted therein, and also maintaining the heat exchanger at a temperature approaching that of the exhaust gases, and thereby minimizing deposits on the interior wall of the flue and the screen, radial ribs, and outer surface of the cylindrical shell of the heat exchanger; whereby more efficient heat transfer to the heat exchanger and flue is realized.

17. A flue heat recovery system as defined in claim 12, wherein the second temperature sensing means comprises a thermostat which is ON if the sensed temperature is less than a first preset temperature and is OFF if the sensed temperature is greater than first preset temperature, and wherein the means for logically combining the sensed temperatures from the first and second temperature sensing means so as to control energization and de-energization of the fan comprises means for sensing a second preset temperature of the first temperature sensing means wherein any or all of the preset temperatures may include a deadband temperature range for a hysteresis effect, and performs said control according to the following truth table:

| First Temp. Sensing Means | Second Temp. Sensing Means | Fan |
|---|---|---|
| >second preset | ON | energized |
| >second preset | OFF | de-energized |
| <second preset | ON | de-energized |
| <second preset | OFF | de-energized |

18. A flue heat recovery system as defined in claim 17, wherein the first temperature sensing means is a thermostat which is OFF if the sensed temperature is less than the second preset temperature and is ON if the sensed temperature is greater than the second preset temperature, and wherein the means for logically combining the sensed temperatures connects the outputs of the first and second temperature sensing means to each other so as to energize the fan only when both temperature sensing means are in the ON state.

19. An exhaust gas to air heat exchanger for use in a flue heat recovery system comprising:

(A) a cylindrical shell with two caps, one placed at either end of the shell;

(B) an exhaust gas conduit passing through each cap of the heat exchanger so as to allow exhaust gas from the heating device to pass through the interior of the heat exchanger in a non-mixing relationship with the air circulating in the heat exchanger;

(C) an air inlet port connected through the cylindrical shell for the receipt of air;

(D) and an air outlet port connected through the cylindrical shell for the exiting of air heated within the heat exchanger;

(E) an air inlet tube connected to the air inlet port, the tube extending within the cylindrical shell along substantially the majority of the length of the heat exchanger before exiting from the air outlet port;

(F) a plurality of thermally conductive radial ribs attached to the periphery of the cylindrical shell in a thermally conductive manner; and (G) a screen having a cylindrical shape attached to the outer periphery of the radial ribs, the screen having a length substantially equal to that of the cylindrical shell so as to define an air space between itself and the cylindrical shell and thereby promote heat transfer from the exhaust gases to the air within the heat exchanger.

20. An exhaust gas to air heat exchanger as defined in claim 19, wherein the exhaust gas to air heat exchanger further comprises means for radially positioning the heat exchanger centrally within a flue so that a majority of the exhaust gases pass in proportionally greater proximity to the interior wall of the flue than if the heat exchanger were not placed within the flue, thereby maintaining the flue at a higher temperature approaching the temperature of the exhaust gases, this temperature higher than it otherwise would be without the exhaust gas to heat air exchanger mounted therein, and also maintaining the heat exchanger at a temperature approaching that of the exhaust gases, and thereby minimizing deposits on the interior wall of the flue and the screen, radial ribs, and outer surface of the cylindrical shell of the heat exchanger; whereby more efficient heat transfer to the heat exchanger and flue is realized.

* * * * *